US007094303B2

(12) United States Patent
Steinke et al.

(10) Patent No.: US 7,094,303 B2
(45) Date of Patent: Aug. 22, 2006

(54) METHOD AND APPARATUS FOR FORMING A CORE OF PLIES, BELTS AND BEADS AND FOR POSITIONING THE CORE IN A MOLD FOR FORMING AN ELASTOMERIC TIRE

(75) Inventors: Richard A. Steinke, Boulder City, NV (US); Theodore M. Love, Las Vegas, NV (US)

(73) Assignee: Amerityre, Boulder City, NV (US)

( * ) Notice: Subject to any disclaimer, the term of this patent is extended or adjusted under 35 U.S.C. 154(b) by 267 days.

(21) Appl. No.: 10/909,807

(22) Filed: Aug. 2, 2004

(65) Prior Publication Data

US 2006/0021693 A1 Feb. 2, 2006

(51) Int. Cl.
*B29D 30/16* (2006.01)
*B29D 30/18* (2006.01)

(52) U.S. Cl. ............... 156/126; 156/125; 156/130; 156/132; 156/133; 156/400; 156/406.2; 156/406.6; 156/421.8

(58) Field of Classification Search ............ 156/125, 156/126, 130, 130.7, 131, 132, 133, 398, 156/400, 401, 406.2, 406.6, 421.4, 421.8; 152/452, 563
See application file for complete search history.

(56) References Cited

U.S. PATENT DOCUMENTS 1,619,019 A * 3/1927 Gammeter ............... 156/126
1,734,023 A * 10/1929 Smith ..................... 156/126
2,476,884 A 7/1949 Maynard
2,521,143 A * 9/1950 Benson ................... 156/414
2,873,790 A 2/1959 Cadwell et al.
4,295,513 A * 10/1981 Lovell et al. ............. 152/563
4,476,908 A 10/1984 Cesar et al.
4,731,137 A * 3/1988 Schmidt et al. ........... 156/125

FOREIGN PATENT DOCUMENTS

GB  1223242  *  2/1971
GB  1246471     9/1971

* cited by examiner

Primary Examiner—Geoffrey L. Knable
(74) Attorney, Agent, or Firm—M. Reid Russell

(57) ABSTRACT

A method and apparatus for forming a core of plies, belts and beads and for positioning the core in a mold for forming an elastomeric tire. The core is built up on a mandrel of the inner mold that is formed from hard foam core segments positioned between top and bottom hub plates, around a center hub that includes flow passages formed therethrough and through the hub plates. Plies for building the core are formed as a woven sleeve for passage along an expander cone and over the mandrel whereon a separator has been positioned, and a bead is passed over each sleeve end that receives a bead centering plate fitted through the sleeve, capturing the bead and positioning it on the mandrel side and provides for folding the plies end over the bead and up each mandrel side. Similarly, a belt or belts, formed as a weave of belt cords, is passed along an expander cone and onto the mandrel crown, with separators positioned between the mandrel, plies and belt or belts, and above a final belt, and a tire core is wound around the crown, from one side to the other.

26 Claims, 24 Drawing Sheets

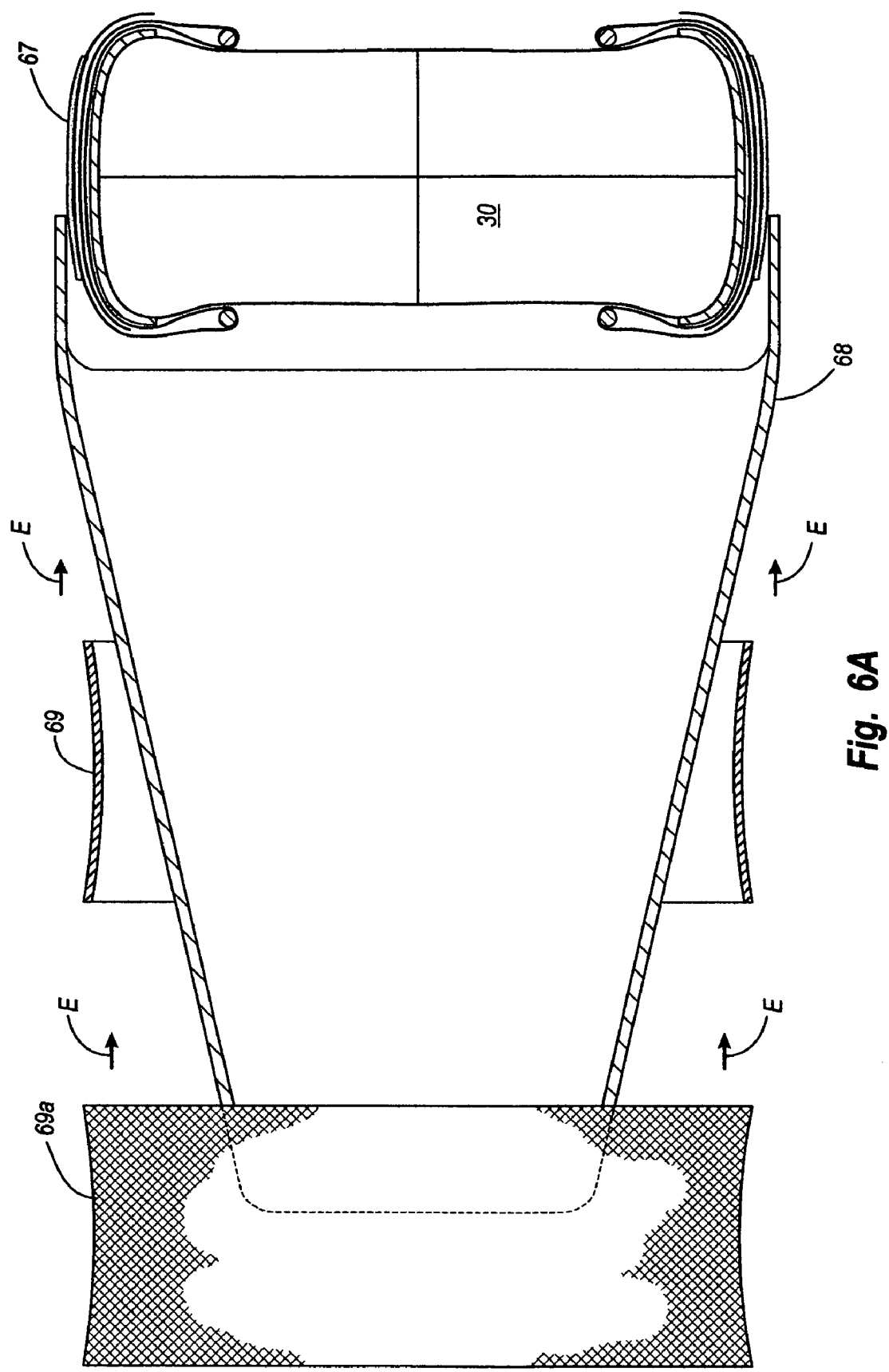

METHOD AND APPARATUS FOR FORMING A CORE OF PLIES, BELTS AND BEADS AND FOR POSITIONING THE CORE IN A MOLD FOR FORMING AN ELASTOMERIC TIRE

BACKGROUND OF INVENTION

1. Field of the Invention

This invention pertains to methods and apparatus for forming a core of belts, plies and beads for positioning in a spin casting mold to receive a flow of an elastomeric material passed therein, to form a transport tire.

2. Prior Art

The present invention is in a new and unique automated method or process and apparatus for the rapid formation of a core of belts, plies and beads, requiring minimum of manual operations and the positioning of the cord in a spin casting mold to form an elastomeric tire. The belts and plies are pre-formed by weaving methods as open sleeves for individual fitting onto a mandrel portion of an inner mold that receives an outer mold fitted thereover. The core is formed in layers with spacers or separators between the mold, plies and belt or belts and, after formation on the inner mold, the core is maintained in the assembled mold annular space to be encapsulation in a tire that is formed from an elastomeric material, preferably in a spin casting process.

The core of the invention is formed in steps, including first positioning a separator formed from a porous material, such as cotton batting, over a mandrel portion of the inner mold. Then successive layers of a separator, plies, a separator, a belt, a separator and a final tire cord layer, are fitted around the crown of the inner mold, sandwiching over one another, with the plies and belt or belts preferably arranged as woven sleeves that are fitted over the crown and with beads fitted to the core sides and receive the plies cords ends folded therearound. Whereafter, the inner mold is coupled to an outer mold, providing a finished mold that contains the core that is to receive a flow of an elastomeric material. Which elastomeric material flow passes through the separators or spacers, and the respective plies and belt or belts, melding with the fibers of cords of the plies and belt or belts, providing an optimum spacing distance apart of the plies, beads and belt or belts in a finished tire. The elastomeric material flow consists of component chemicals that are combined and react, providing an exothermic reaction generating heat, in forming a finished tire. Where, heretofore in earlier tire forming processes, workers have sequentially positioned, and bonded together with adhesives, layers of green rubber and fabric and steel belting around a mandrel, building a tire from the inside out. Which process includes encapsulating beads in the side walls ends, with the assembly then cooked or vulcanized, under heat and pressure, in a mold, forming a tire. Additionally, while some prior art exists showing a attempts at molding tires utilizing elastomeric compounds other than rubber, such have not provided, as does the invention, for building a tire core of plies, belts and beads utilizing separate pre-formed sleeve or tubular sections of plies and belts that are formed by weaving methods from rayon or cotton cord and provide for sequentially pulling success spacer, plies and belts layers over a tire a mandrel, forming the core as a stack of separators or spacers, plies and belts, with the plies cord ends folded around the beads, that then receive a tire cord wound around the core outer circumference, completing the core.

Examples of such earlier patents that do not involve the above steps and the apparatus for their practice of the invention are set out in U.S. Patents to Maynard, U.S. Pat. No. 2,476,884; to Cadwell et al., U.S. Pat. No. 2,873,790 and to Cesar, et al., U.S. Pat. No. 4,476,908: and in a British Patent to Merriman, et al., U.S. Pat. No. 1,246,471. Prior to the present method one of the present inventors was an inventor of a U.S. Patent Application for a Tire Core Package for Use in manufacturing a "Tire with Belts, plies and Beads and Process of Tire Manufacture" Ser. No. 10/143,678, filed May 13, 2002, that is presently pending, and sets out a process, utilizing a sandwich of pre-cured elastomer between layers of plies and belts formed over a mandrel for fitting into a mold, for forming a tire utilizing a spin casting method. Also, one of the inventors of the present application is the sole inventor of a U.S. Patent Application for an "Elastomeric Tire With Arch Shaped Shoulders" filed May 28, 2004, assigned Ser. No. 10/856,652. Further, the present invention is a further development of the invention as shown and discussed in a recently filed U.S. Patent Application of the inventors, entitled, "Method and Apparatus for Forming a Core of Plies, Belts and Beads and For Positioning the Core in a Mold For Forming an Elastomeric Tire and the Formed Elastomeric Tire", filed Jun. 4, 2004, Assigned Ser. No. 10/860,997.

Unique to the invention is a separate formation of flexible cylindrical plies and belt sleeves that are each a weave of plie and belt cords, with the sleeves preferably each including strands of an elastic material woven into the sleeve that allow the sleeve to expand when it is pulled across a frustrum cone from the lesser to greater diameter cone ends, and contract, fitting snugly to, the mandrel crown. Which cone or cones for use with the invention may be different cones that vary in successively larger greater diameter ends depending upon which sleeve or plies or belt or belts is being pulled thereover, or may be the same cone with the sleeves having a capability to expand sufficiently to be pulled thereover and contract into tight fitting engagement over the mandrel crown. In practice, the cone greater diameter end is aligned with the edge of a mandrel that is the shape of a tire inner surface having a separator layer fitted thereover, with the separator covered mandrel crown to receive, successively, sleeves or plies, belt or belts fitted thereon, with spacers or separators fitted therebetween. With, in practice, the sleeves of plies, a belt or belts being slid off the cone and pass onto the mandrel crown where they individually retract into tight fitting engagement, forming a stack of separators or spacers, plies and belt or belts Which core stack is then capped with a wrap of tire cord. With the plies ends draped down the mandrel sides to receive a bead fitted to each core side that the plies ends are folded around.

A practice of the method on the apparatus of the invention provides for a near automated system for forming a core of plies, beads and belts that is encapsulated in a tire formed by a spin casting method, and is a major improvement to tire formation as a first efficient method for the manufacture of a balanced transport tire from an elastomer, notably urethane.

SUMMARY OF THE INVENTION

It is a principal object of the present invention to provide a process and apparatus for forming a core of plies, belts and beads, with the plies and belts separated by porous spacers and the beads maintained in position to the plies sides, with the core of plies, belts and beads to be encapsulated in an elastomeric tire formed by spin casting methods, providing optimum positioning of the plies, belts and beads in that finished tire.

Another object of the present invention is to provide a process and apparatus for manufacturing an elastomeric tire with a core of plies, belts and beads encapsulated therein in a spin casting process where the plies, belts and beads are built up on an inner mold or mandrel surface that has the shape of a tire inner surface, where the core formation is accomplished in a semi-automated process with sleeves of woven cords forming the plies and belts drawn or formed onto the mandrel crown, providing a stack with porous separators therebetween and with beads positioned onto the plies side walls and where the plies ends are folded and around the beads, forming the core that is capped with tire cord, and with an outer mold fitted thereto where the core of plies, belts and beads is positioned in the mold annular portion to receive a flow of liquid elastomeric material passed therein as the mold is spun up, providing a tire formed by spin casting where the core of plies, belts and beads is encapsulated therein.

Another object of the present invention is to provide a process and apparatus for manufacturing an elastomeric tire with a core of plies, belts and bead encapsulated therein utilizing an elastomer that is a mixture of a selected isocyanate and polyol that are combined to have, when cured, physical properties comparable to those of a conventional transport tire designed for carrying a like load to that of a tire produced by a practice of the process of the invention.

Another object of the present invention is to provide a process where plies and belts are formed, by weaving plies and belts cord into individual cylindrical sleeves that are for fitting over an inner mold have the shape of an tire interior surface, one over the other, forming a stack with porous separator layers laid up between the inner mold and plies, and between each layer of plies and belts, and above a last belt, with a top separator then receiving a wrap of tire cord, and a* guide arrangement is provides for each of a pair of beads that positions the individual bead onto the sides of the plies and provides for folding the plies cords ends over the beads and securing the plies cords ends above the beads together.

Another object of the present invention is to provide a process and apparatus for forming an elastomeric tire where, in a formation of the core, the plie cords ends are folded around the tire beads that are maintained in position and the plies cords ends are smoothed back onto the plies cords mid-portions and are there held in place to receive a flow of an elastomeric material in a spin casting process, that encapsulates the core at an optimum position in the molded tire and provides a near perfectly balanced finished tire.

Another object of the present invention is to provide sleeves as the plies and belt or belts that are woven from rayon or cotton cord, that include in the weave, elastic or semi-elastic cord that allow the sleeves to be expanded as they are pulled over the tire mandrel and, when that expansion force is removed, will retract to fit snugly onto the inner mold, over layers of plies, separators, and belts, as have already been applied onto the inner mold.

Still another object of the present invention is to provide, as an apparatus for expanding the plies and belts sleeves, an elongate frustum cone having a greater diameter end that fits snugly over one side of the tire inner mold or mandrel side to the inner mold center, and receives the individual plies and belts or belts sleeve pulled over the elongate frustum cone small diameter end, that expands as it is pulled over the large diameter end, and retracts when released to fit snugly onto the tire inner mold or mandrel crown.

Still another object of the present invention is to provide, an apparatus for pivoting the core during its formation from one tire side through one hundred eighty degrees, to the other tire side, to provide for installing beads to the plies sides.

Still another object of the present invention is to provide an apparatus for urging the plies ends, above their fold around the bead, back against themselves and for bonding said plie cords and plies cords end portions to one another;

Still another object of the present invention is to provide for maintaining belt positioning by folding and maintaining the belts sides and separator or spacer sides down the plies.

Still another object of the present invention is to provide a process for winding tire cord, that is preferably Kevlar cord, around the top belt circumference, completing the core of plies, belts and beads.

The present invention is in a semi-automated process and apparatus for forming a tire core of plies, belts and beads that is laid-up upon on a mandrel portion of an inner mold that, when connected to outer mold components, provides a center annular cavity that is open to received a flow of liquid elastomeric material as is produced in a mixing of an isocyanate and polyol that is passed into the mold as it is being turned, filling the annular cavity and forming the elastomeric tire with the core of plies, belts and beads encapsulated therein. A mold for practicing the method can, but need not be, arranged with a spin casting apparatus that is like that set out in U.S. Pat. Nos. 4,855,096 and 4,943,323; and 5,906,836, and 6,165,397, that one of the present inventors is a joint inventor of, and improvements thereto. The invention provides a use of an inner mold that has a mandrel portion whereon is built-up layers of plies, belts and beads, and combination thereof, to form a tire core. Whereafter, the inner mold receives an outer mold fitted thereto, with the core occupying an annular portion of the finished mold that is to receive a flow of the elastomeric material, forming, by spin casting, in a single molding operation, a finished elastomeric tire that is essentially perfectly balanced.

The process of the invention is preferably practiced on an inner mold that is bolted together from internal mold components that include: top and bottom hubs, a manifold and hard core segments that are assembled into the inner mold, with the hard core segments functioning as a mandrel that has a shape of a tire interior wall, providing a surface for building the tire core on. The inner mold is preferably mounted on a movable arm capable of being pivoted through one hundred eighty degrees, allowing an operator to operate on both sides of the inner mold and with the inner mold in a horizontal attitude. In a first embodiment, a sleeve is formed from a weave of plie cords that includes elastic cords or strands woven therein. So arranged, an expander cone, that is a truncated cone, is positioned alongside the side of the inner mold side that has received a layer of spacer material around the mandrel. The spacer or separator material is preferably a cotton batting, wound therearound, and the plies sleeve is pulled over the expander cone apparatus and onto the inner mold, above the spacing material. The plie sleeve is cut to where the plies cords hang down the same distance on the inner mold sides, and the inner mold mandrel, above the plies, is wrapped circumferentially with a spacer that is preferably a two layer section of cotton batting. An inelastic bead is slid over each plies sleeve end and a mold centering plate is fitted into each sleeve end and slid therealong, a bead centering plate outer edge capturing the bead and moves it against the plies, in proper position on the inner mold. The hanging plies cords are folded around the beads and upon themselves above the bead. Preferably, the application of the beads and plies cord folding are accomplished with the bead center plate that further includes an expanding bladder apparatus that, after the bead is properly positioned onto the plies cords sides, folds the plies cords across the beads and sweeps the plies cords against their mid-portions. An adhesive, such as a pre-cured elastomer is applied to the contacting plies cords and the bladder is deflated and urged thereagainst to press out any air trapped in the coating of adhesive therefrom.

Onto the inner mold wrapped with the layer of spacing material, plies with the beads fitted to the plies and the plies ends folded over the beads and bonded onto the plies sides, a second section of cotton batting, that is approximately eight inches in width, is fitted circumferential around the crown of the inner mold. Thereafter, for this embodiment, the expander cone apparatus is refitted to the side of the inner mold and a belt sleeve formed by weaving methods from belt cords and containing elastic strands or cords is pulled over the expander cone to extend across the inner mold circumference. The sleeve is either of the appropriate length to extend across the crown, or is cut to a width to provide for covering the crown. The cotton spacer or separator edges are folded down, partially over the plies, and the belt first receives a separator that is preferably a two ply layer of a section of cotton batting wrapped circumferentially around the belt circumference and then a covering wrap of tire cord, is wrapped therearound, completing the core fabrication. Which belts are woven to where the cords of two belt sections cross and with the cords of each section forming an angle of approximately twenty four degrees to the center of the core circumference. Additionally, as required, more than one belt can be so fitted around the inner mold with spacer layer, that is preferable the two ply section of cotton batting, and is positioned between each belt.

As a second embodiment, after the plies have been positioned on the inner mold and the beads applied to the plies sides, and with the plies ends folded upon themselves and secured, the inner mold can receive each of a pair of gear plates fitted to the inner mold sides with the teeth of which gear plates aligned. So arranged, belt cord is wound back and forth between teeth that are off-set such that the belt cord forms approximately a twenty four degree angle to the inner mold circumference, forming a belt section. With a second belt section formed, as described, over the other, only with the cords of the belts sections crossing, each cord at an angle of approximately twenty four degrees to the inner mold circumference. So arranged, a single belt can be formed around the inner mold circumference, or, where a plurality of belts are so formed each from crossing belt sections, the separator layer, that is preferably of two ply cotton batting, is fitted between each belt, and a two ply or layer section of cotton batting, that is approximately eight inches in width, is fitted onto the top belt and which cotton batting section receives a wrap of tire cord therearound, completing the core.

As described above, the invention includes a use of the expander cone to position the woven sleeve of plie cords over the inner mold covered by the separator. Thereafter, with the plies sleeve maintained in position, and is cut to leave equal lengths of cords extending down each inner mold side and the expander cone is pulled out of the sleeve. The sleeve then contracts into tight fitting engagement over the inner mold mandrel portion. With the plies ends hanging down the sides of which inner mold. Similarly, where the belt or belts are formed as a woven sleeve of belt cords, the belt is pulled over the extender cone that stretches the sleeve to pass over the cotton batting separator to the opposite edge. Whereat, if the sleeve is not precut to the desired width, the sleeve is then cut to align with the proximate inner mold edge, and the opposite sleeve edge is held in place as the extender cone is removed, allowing the belt sleeve to contract and fit snugly onto the cotton batting separator.

After the core of plies, belts and beads is assembled and the tire cord wound around the circumference, the outer mold is fitted to the inner mold, with the formed core occupying the finished mold annular area. Thereafter, a flow of an elastomeric material is directed into the mold while it is spinning at a rate of between two hundred fifty and seven hundred r.p.m., forming a balanced transport tire that contains the core of plies, belts and beads that, after cooling, is removed from the mold

DESCRIPTION OF THE DRAWINGS

The invention may take physical form in certain parts and arrangement of parts, used to practice the steps of the invention and preferred embodiments of which will be described in detail in this specification and illustrated in the accompanying drawings which form a part hereof:

FIG. 6A shows a top plan view like that of FIG. 4B except that the expander cone is shown fitted over the hard core assembly whereon the plies and beads have been assembled, and a separator, that is a layer of cotton batting, has been applied, and showing a belt sleeve formed as a weave from crossing sections of belt cord aligned with the expander cone smaller end and showing, with arrows E, that belt sleeve traveling up the expander core;

DETAILED DESCRIPTION

Figure 1:
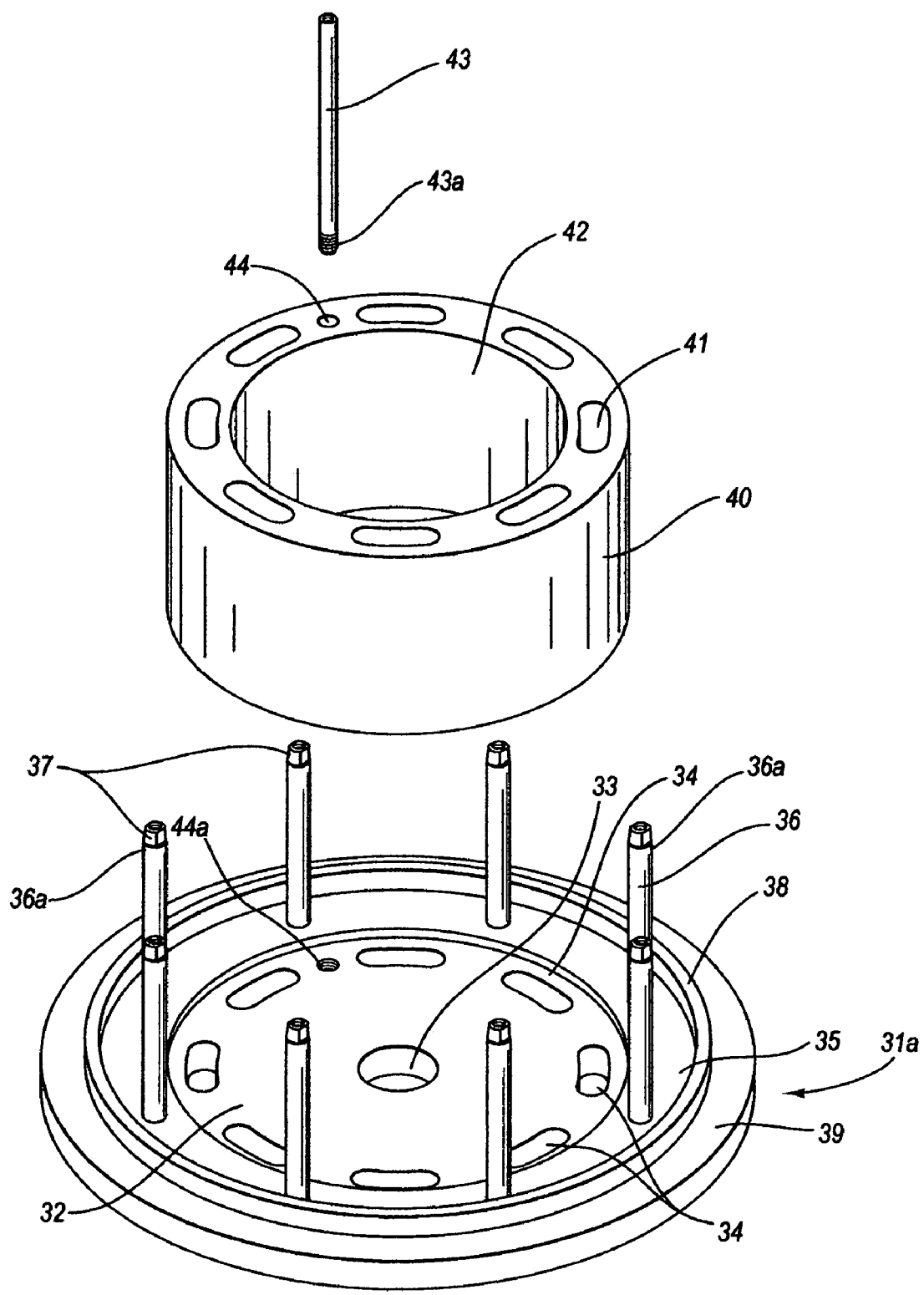
FIG. 1 shows an exploded perspective view taken from above a bottom hub plate whereto a manifold is being fitted with studs turned into the bottom hub plate, forming an inner mold of the apparatus of the invention that is used in a practice of the process of the invention.
Figure 6B:
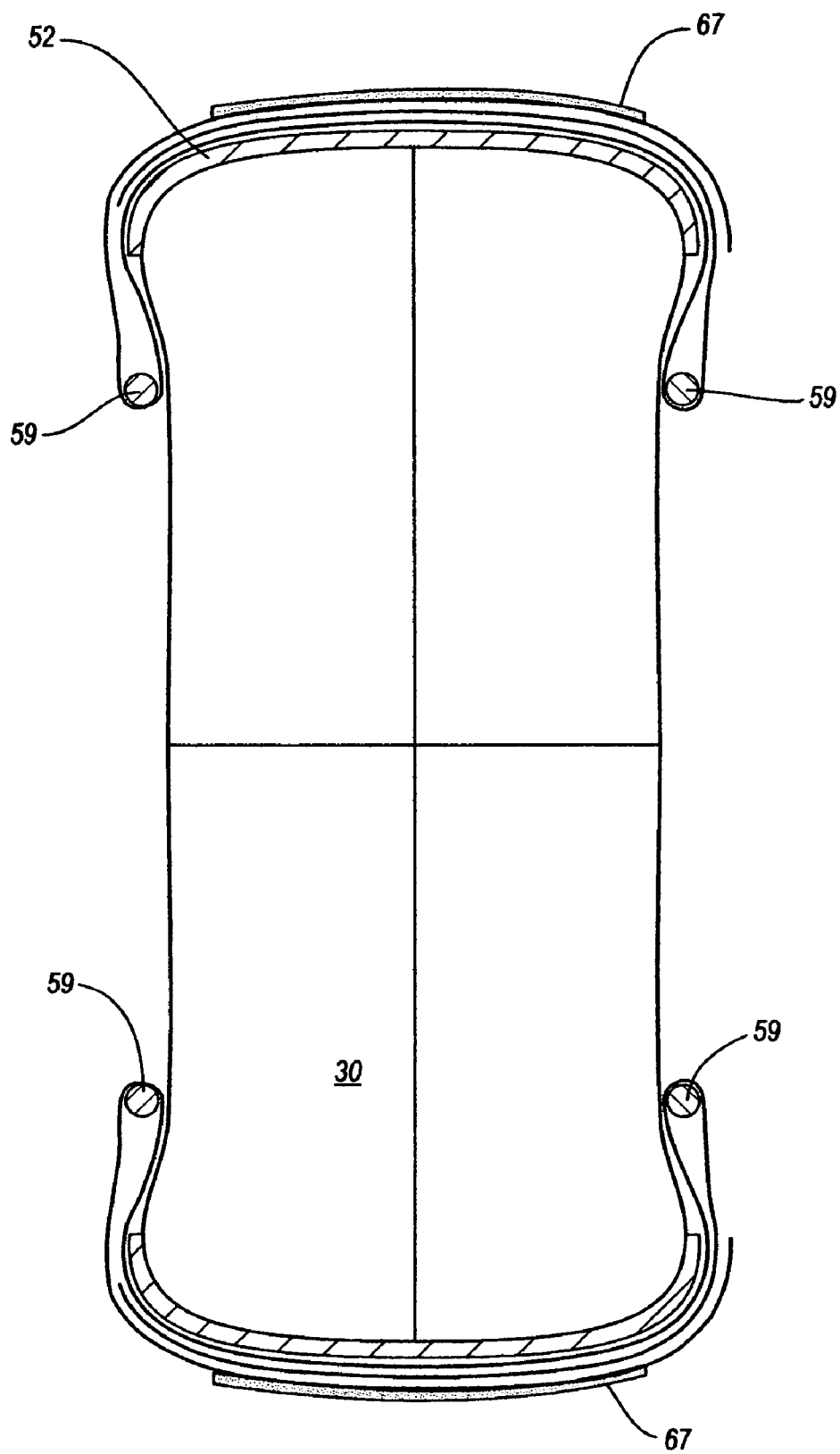
FIG. 6B shows the hard core assembly with the plies ends extending up the hard core assembly sides, and spacers arranged between the plies and belt with a final layer of tire cord wound around the crown.
Figure 9:
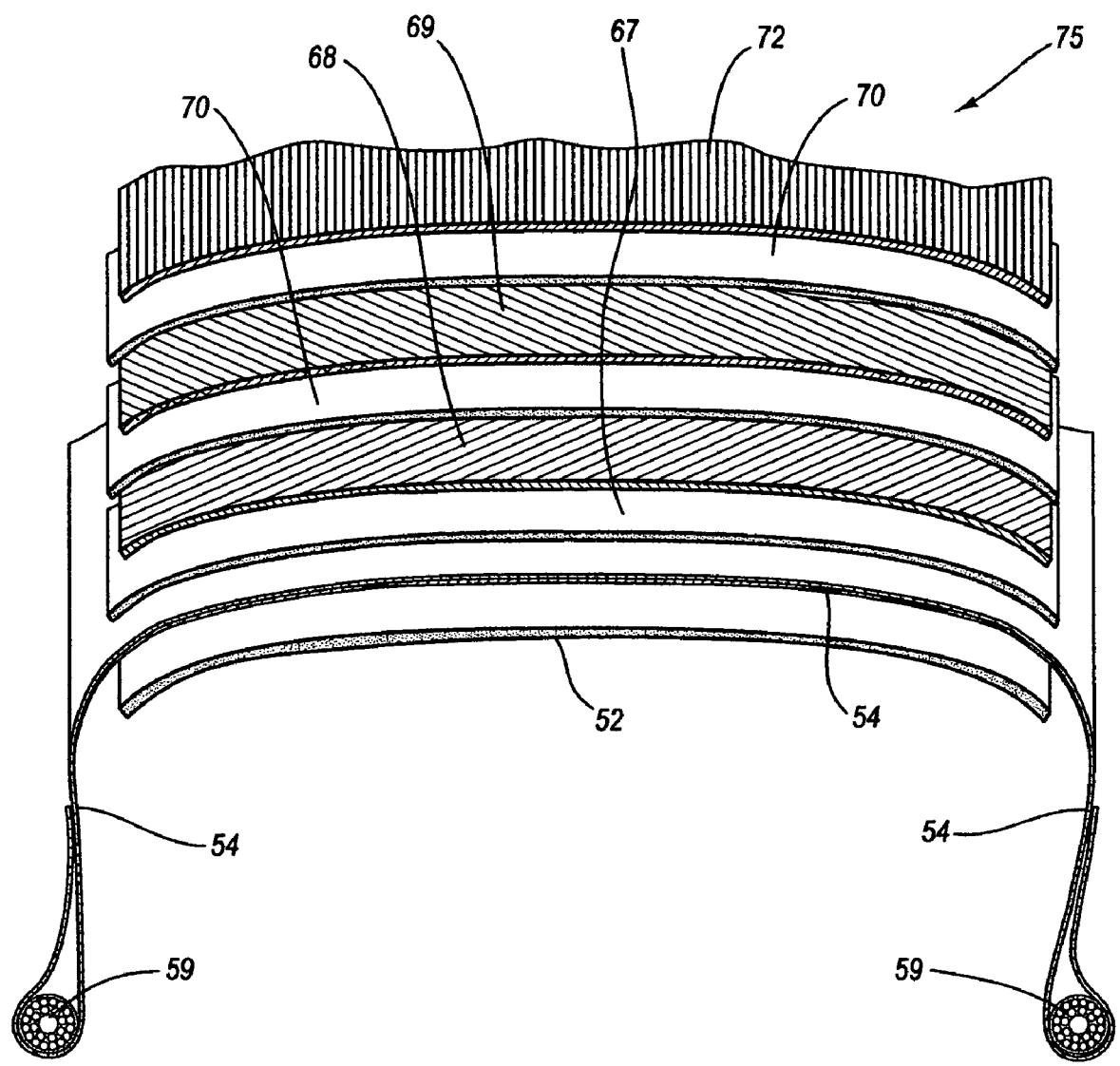
FIG. 9 shows a side elevation exploded sectional view of a section of a tire manufactured by the process and with the apparatus of the invention.
Figure 10:
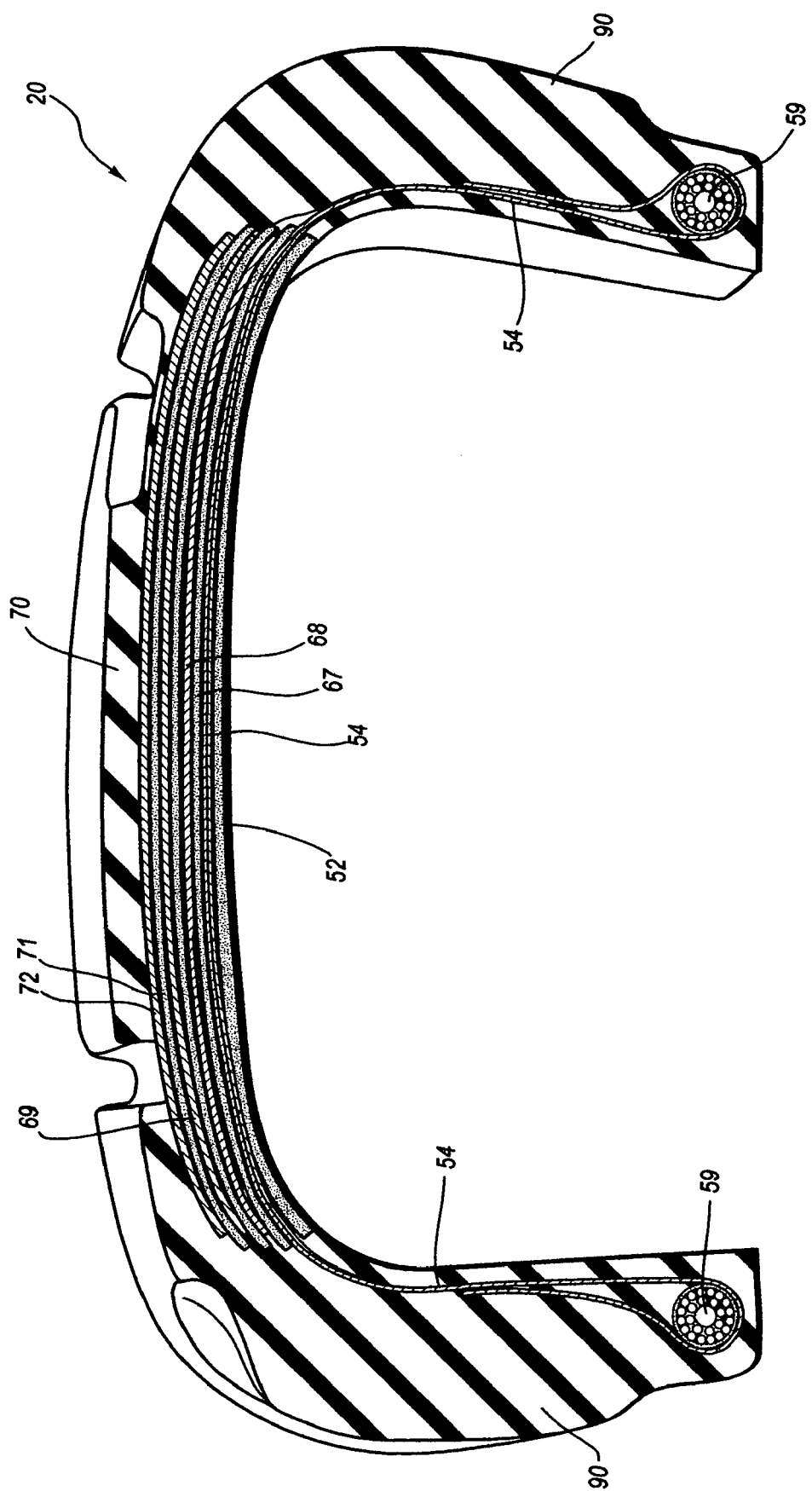
FIG. 10 shows an assembled view of the tire of FIG. 9.

The invention is in a process and apparatus for forming of a tire core within an inner mold of properly positioned plies, belts and beads, closing that inner mold with an outer mold that is to receive a flow of a liquid elastomeric material flow directed therein with the mold spun to form a spin cast tire. Forming a tire 20, as shown in FIG. 10, having a core 75 of plies, belts and beads, as shown in FIG. 9, encapsulated therein, provides a near perfectly balance tire that is like that produced by a practice of the method or process of the invention in apparatus of the invention, shown in sectional views in FIGS. 9 and 10. To form an inner mold 30 for forming a core 75, as shown in FIGS. 6B, 7G and 9, an inner mold hub base 31*a*, as shown in FIG. 1, is used. The inner mold base 31*a* is shown as having a center dish 32 that has a center opening 33, includes spaced elliptical ports 34, and is stepped upwardly in to a continuous shelf 35 that posts 36 are mounted to extend at right angles from. Which posts 36 are located at spaced intervals, and each post includes a threaded nut 37 that is secured onto each post end 36*a*. Outwardly from the posts 36, the hub base 31*a* is stepped upwardly into a lip 38 and, outwardly from the lip 38, it is stepped downwardly into a flat portion 39 that extends to the plate edge. Shown in FIG. 1, a cylindrical hub 40 that has a center opening 42 therethrough and has its lower end aligned to fit onto the center dish area 32, and is positioned thereon to align spaced elliptical ports 41 with the spaced elliptical ports 34 of the hub base. The cylindrical hub 40 is maintained in position by fitting a rod 43 through a side longitudinal hole 44 and turning a rod threaded end 43*a* into a threaded hole 44*a* that is formed into a side of the hub base 31*a*.

Figure 2A:
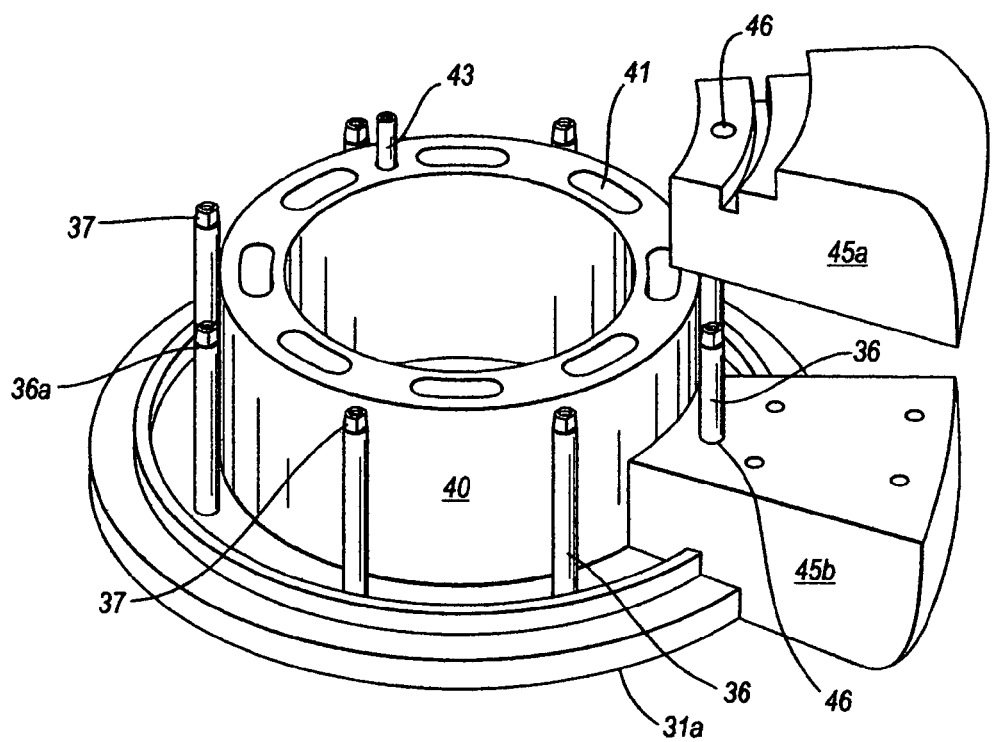
FIG. 2A shows the inner mold components of FIG. 1 receiving a pair of hard foam core segments fitted over the studs.
Figure 2B:
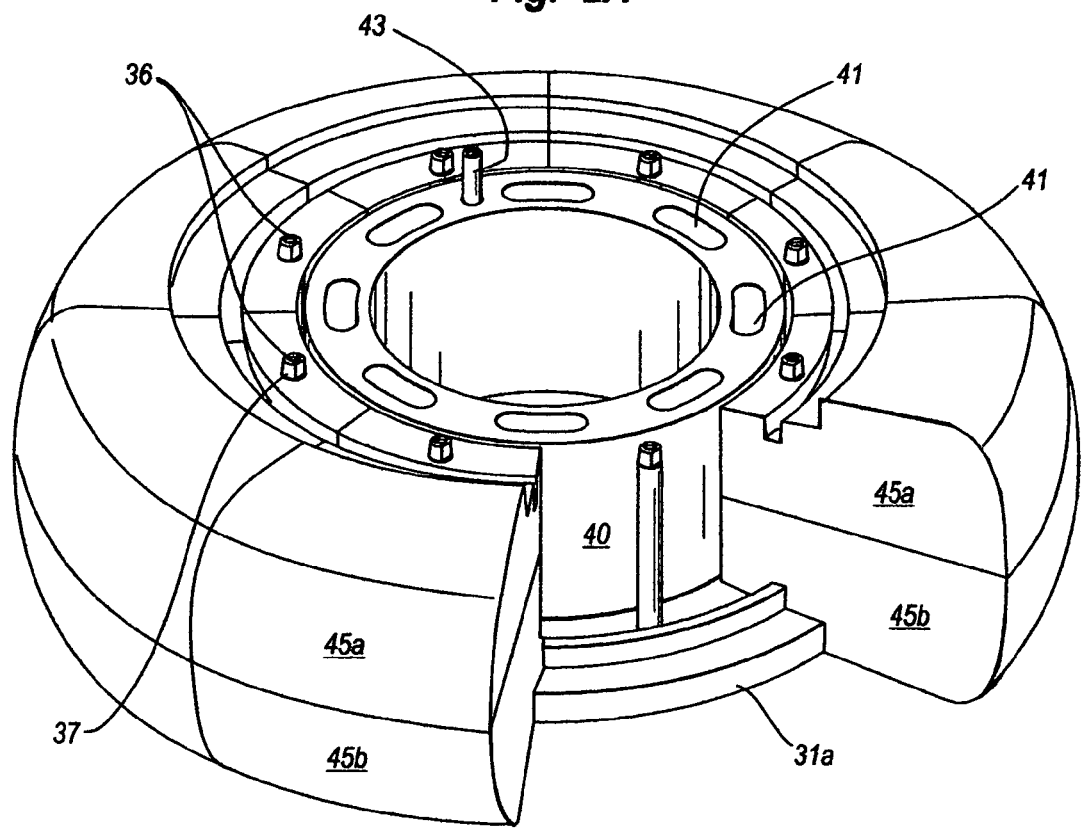
FIG. 2B shows all but a pair of the hard foam core segments assembled to the bottom hub as a mandrel.

FIG. 2A shows the hub 40 fitted onto the inner mold hub base 31*a* and is maintained thereon by the rod 43 threaded end 43*a* turned into the hub base threaded hole 44*a*, as shown in FIG. 1. FIG. 2A shows mounting holes of the hard foam core top and bottom sections 45 and 45*b*, respectively, receiving one of the posts 36 fitted therethrough. With, in FIG. 2B, all but one pair of hard foam core top and bottom sections 45a and 45b have been fitted onto posts 36, and nuts 37 are shown as having been turned onto the post threaded ends 36a.

Figure 3A:
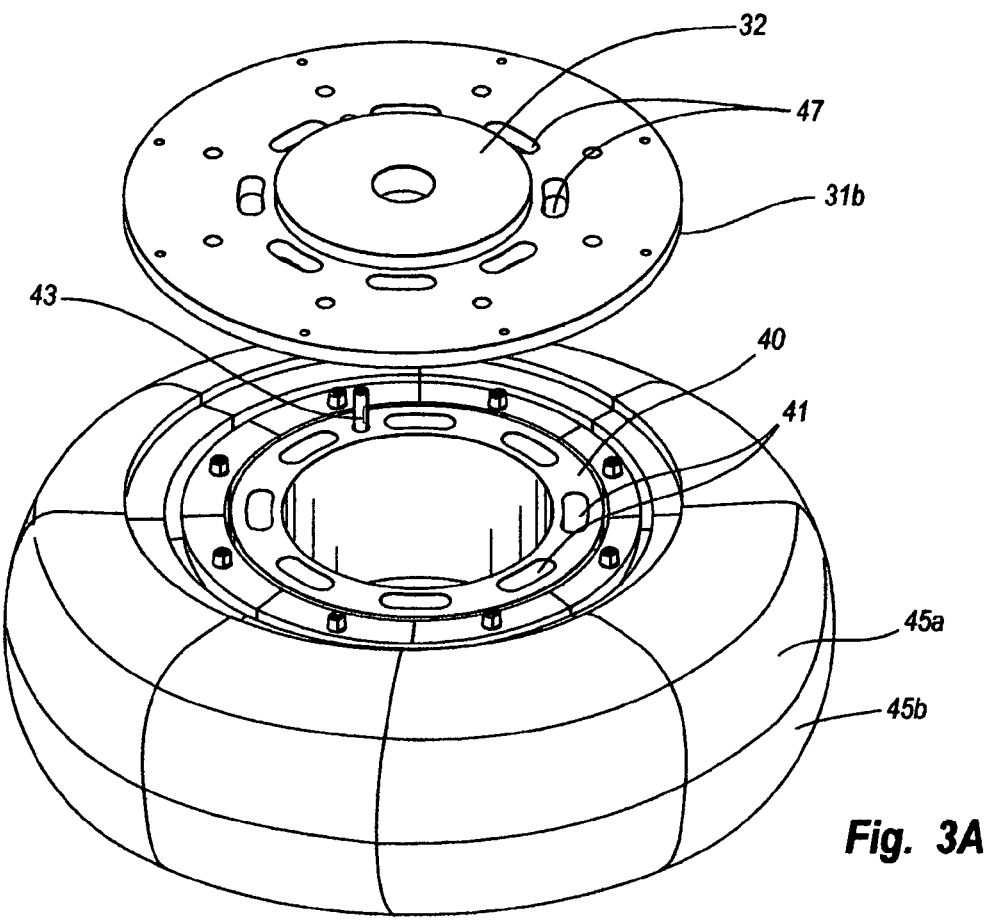
FIG. 3A shows the completion of the hard foam core segments assembly and with a top hub plate fitted onto the hard foam core segments.
Figure 3B:
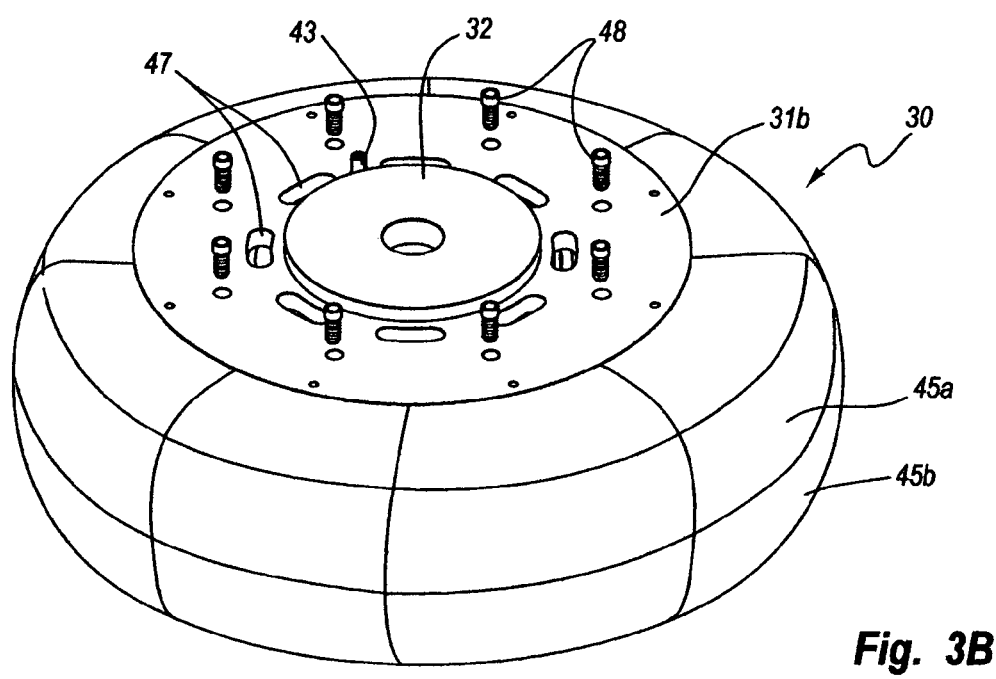
FIG. 3B shows the top hub plate being bolted onto the top of the manifold.

FIG. 3A shows the top of the hub 40 with the hard foam core top and bottom sections 45a and 45b assembled thereon aligned with a hub top 31b with, it should be understood, the hub base and top, 31a and 31b, respectively, being a mirror image of one another. FIG. 3B shows the hub top 31b fitted onto the top of hub 40, with spaced elliptical ports 41 formed through the hub top 31b that includes elliptical ports 47 that align with the elliptical ports 41 in hub 40 and the elliptical ports 34 in the hub base 31a, proving flow paths through the assembly, and showing bolts 47 each aligned for turning through the hub top 31b and into a nut 37. With each nut 37 shown as having been turned onto a threaded end 36a of each post 36, completing the assembly of the inner mold 30, with the assembled hard foam core sections functioning as a mandrel for building up a tire core thereon.

Figure 4A:
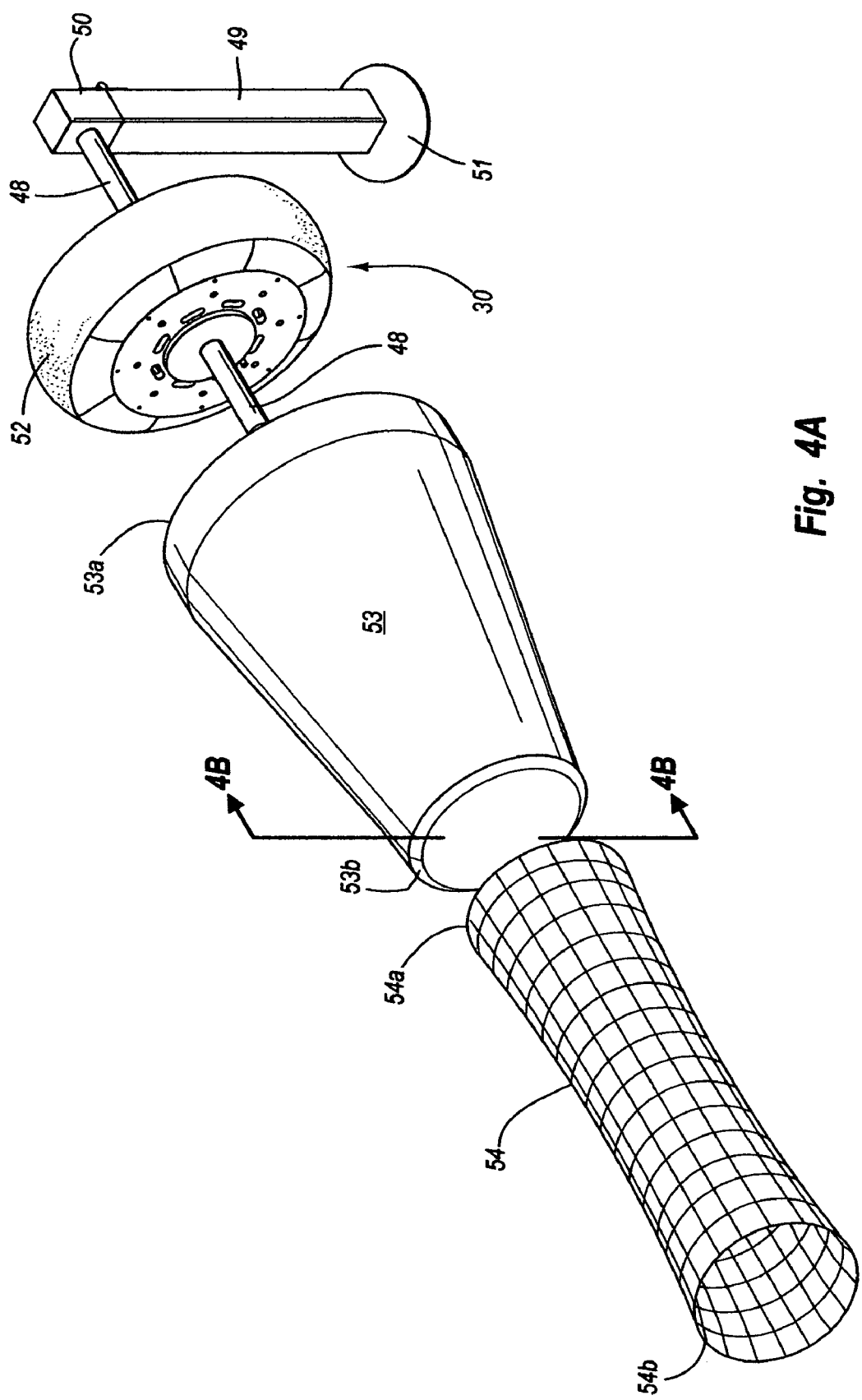
FIG. 4A shows the hard core assembly of FIG. 3B as having been mounted onto an axle that is fitted to a pivoting arm, with the hard core assembly shown rotated ninety degrees, showing an expander cone aligned with the side of the hard core assembly, and showing a sleeve woven from ply cords aligned to fit over the expander cone smaller end.

FIG. 4A shows the inner mold 30 as having had an axle 48 mounted through the aligned center openings 33 in the hub base and top 31a and 31b, as part of a build stand whereto the inner mold 30 has been pivoted from a horizontal attitude through ninety degrees, and with the axle 48 extending at a right angle outwardly from a pivot post 49. Which pivot post 49 preferably includes a pivoting joint 50 that allows the inner mold 30 to be pivoted to a horizontal attitude, and with the base 51 thereof arranged to allow for three hundred sixty degrees of rotation, forming the build stand.

Shown in FIG. 4A a layer of spacing material 52 has been wrapped around the inner mold 30 crown, that is preferably at least a two ply or layer of cotton batting. An expander cone 53 that is shown as a truncated cone having a greater diameter forward end 53a and a lesser diameter rear end 53b, and is fitted onto, to slide along axle 48. The expander cone 53 is to receive a sleeve 54 that is sleeve woven from plies cord that, for a practice of the invention, is preferably rayon or cotton cord that, in practice, has been found to accept a flow of the elastomeric material into the cord surface, providing a weld of the cord and elastomer that is resistive of separation, and, as needed, can include strands of an elastic material woven therein to allow for expansion as it is fitted over the expander cone lesser diameter rear end 53b and drawn therealong.

Figure 4B:
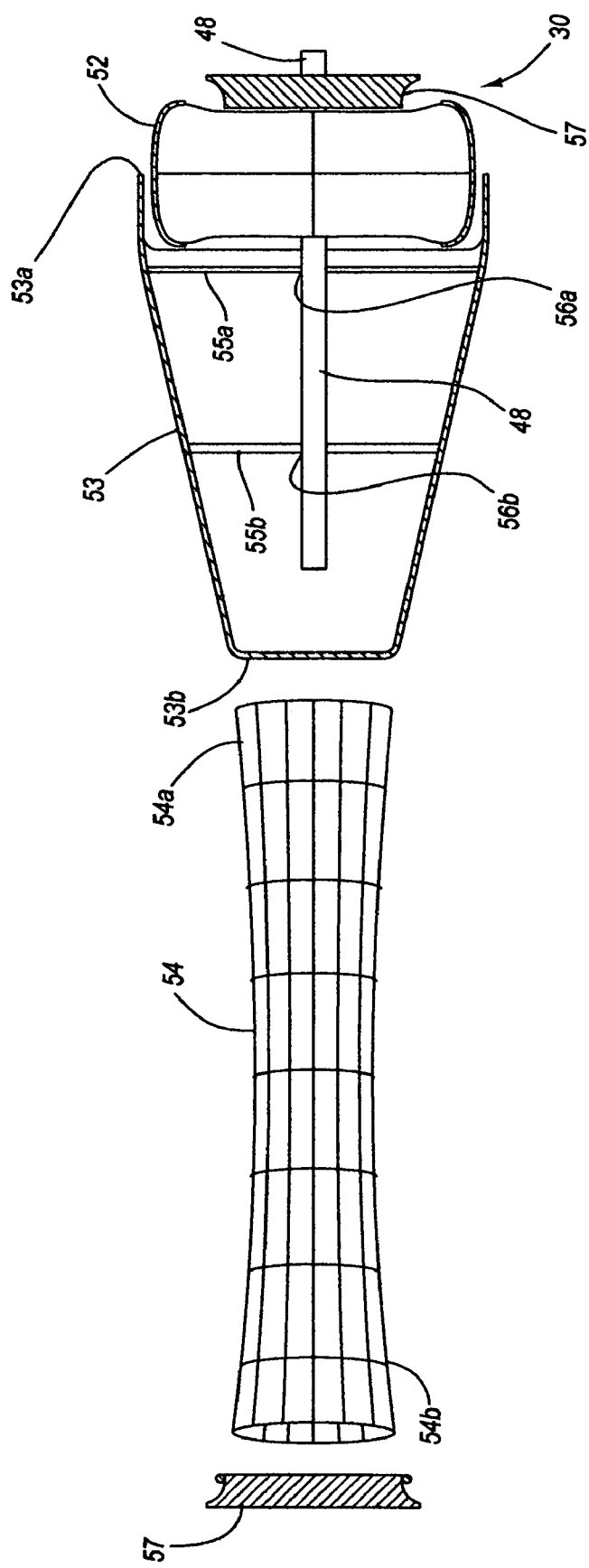
FIG. 4B shows a top plan sectional view taken along the line 4B—4B of FIG. 4A looking down on the hard foam core assembly with the expander cone large diameter end slid along the expander cone to the center of the hard core assembly, showing the plies sleeve aligned for fitting over the expander cone small diameter end and with a pair of bead centering plates aligned with the opposite hard core assembly sides.

FIG. 4B shows the expander cone 53 as having had its forward end 53a moved over the edge of the layer of spacing material 52 to approximately the center of the inner mold 30 mandrel crown. Which expander cone, to allow such movement, includes spaced parallel forward and rear inner walls 55a and 55b, respectively, that each has a center hole 56a and 56b therethrough that align to receive the axle 48 fitted therethrough. The axle 48 supports and guides the expander cone 53 as it is slid back and forth therealong. Further, bead center plates 57 are shown, respectively, contacting a right side of the inner mold 30 and are aligned to passthrough the plies sleeve 54, whose function is set out below.

Figure 4C:
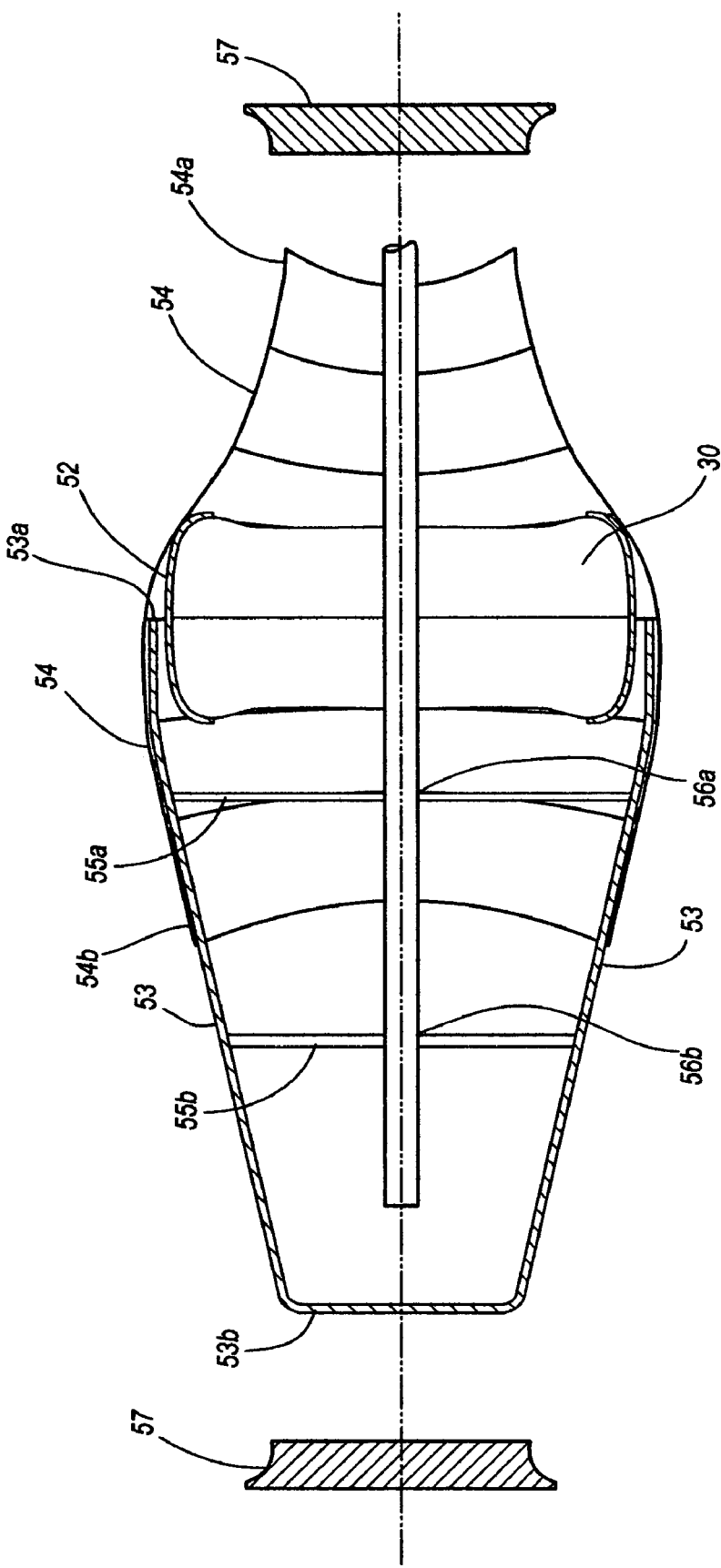
FIG. 4C is a view like that of FIG. 4B except that the plies sleeve end has been drawn over and beyond the hard core assembly, and with the bead centering plates aligned with the centers of the opposite hard core assembly sides.

FIG. 4C shows the components of FIG. 4B except that the forward portion of the plies sleeve 54 has been pulled across the inner mold 30 mandrel, with the back section still supported by the expander cone 53.

Figure 4D:
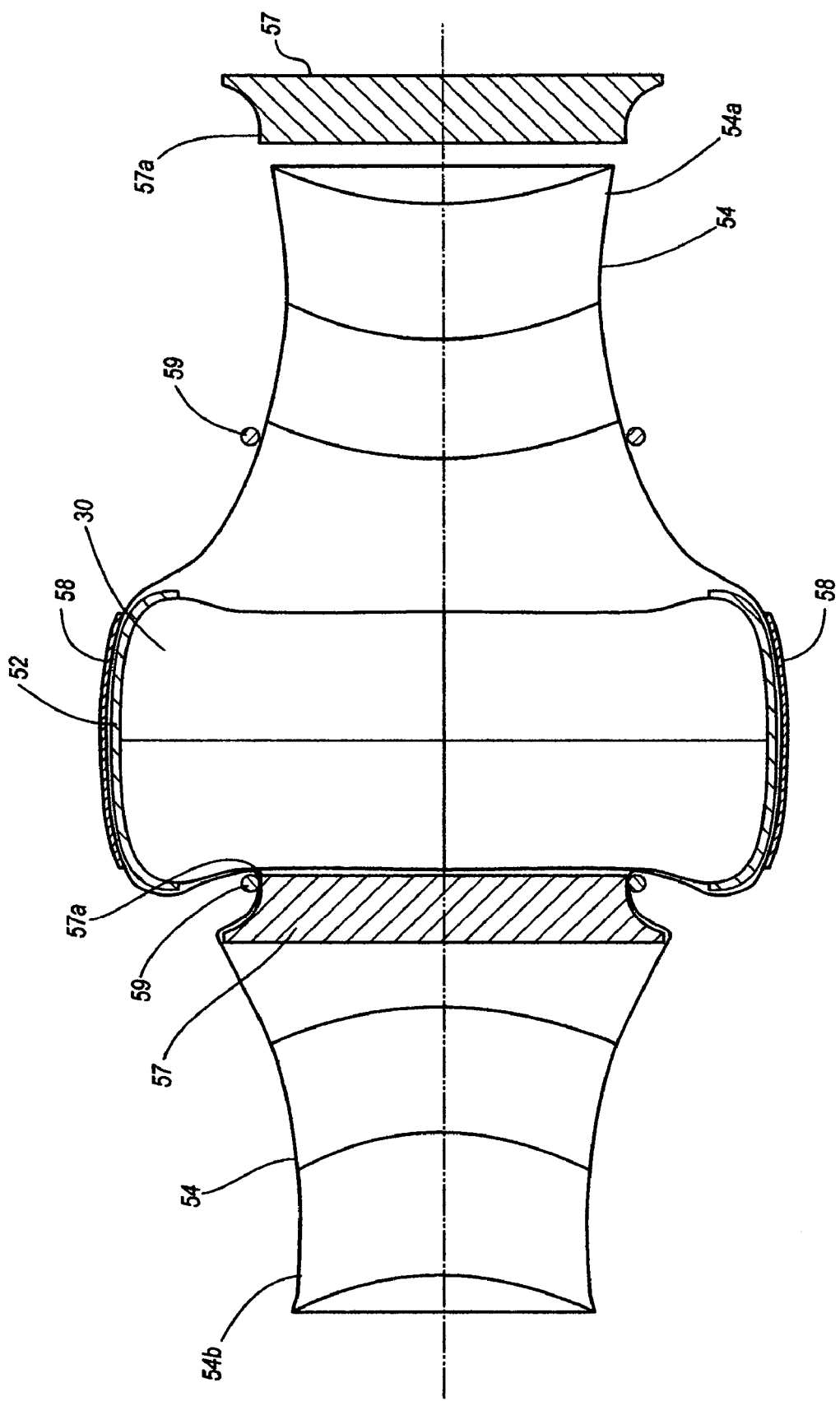
FIG. 4D is a view like that of FIG. 4C except the expander cone has been removed and the left side bead centering plate has been fitted into the plies sleeve after an inelastic bead has been fitted over the sleeve end and with the bead shown positioned by the bead centering plate edge against the hard core assembly left side.

FIG. 4D is the view of FIG. 4C after the expander cone has been removed and a separator layer 58, that is preferably a two ply layer of cotton batting, wrapped over the plies at the crown of the inner mold 30 mandrel. Thereafter, inelastic hoop shaped beads 58 are slid along the outside of the plies cord sleeve 54 ends. A left bead centering plate 57 is fitted into the sleeve end, travels through the sleeve, capturing the bead 58 on its end 57a and positioning the bead in proper alignment against the inner mold 30 left side. Similarly, a bead centering plate 57 is shown aligned for fitting into the plies cord sleeve 54 right end, for also capturing and positioning the bead 58 against the right side of the inner mold.

Figure 4F:
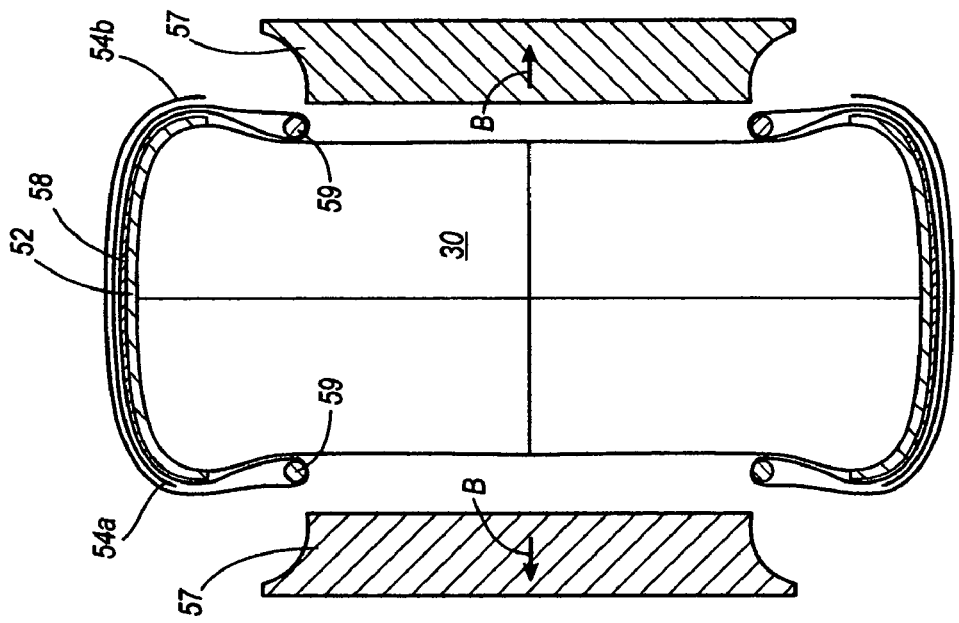
FIG. 4F is a view like that of FIG. 4E only showing the plies cords ends as having been folded across the hard core assembly circumference, the left side plies cords ends covering the right side plies core ends, and showing the bead centering plates being removed, illustrated by arrows B.
Figure 4E:
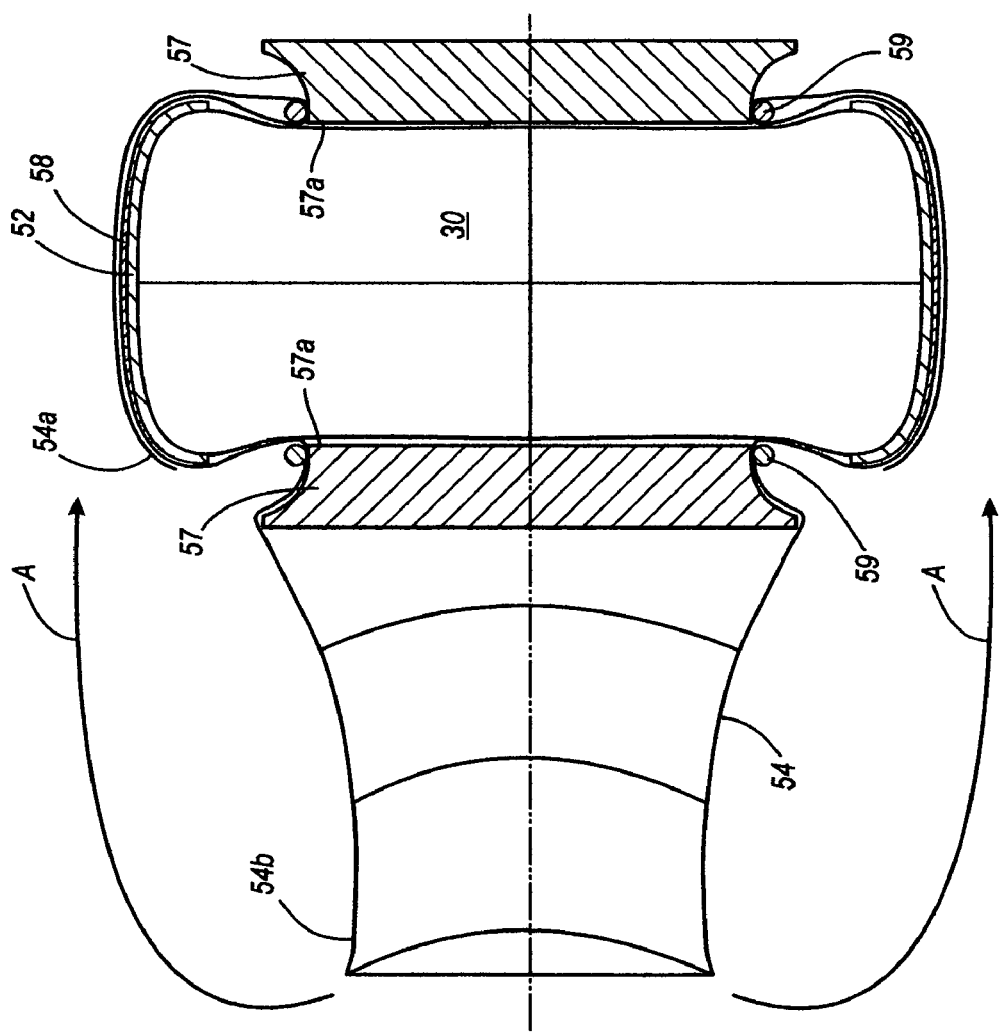
FIG. 4E is a view like that of FIG. 4D except that the bead centering plates have both been fitted through the plies sleeve ends and beads fitted thereon, with the right side plies shown as having been folded around the bead and positioned across the hard core assembly circumference, and with arrows A illustrating the folding of the left side sleeve across the hard core assembly circumference.

FIG. 4E shows both the bead centering plates 57 fitted through the plies sleeve with the beads 59 positioned by the bead centering plates ends 57a against the sides of the inner mold 30, and showing the left end of the plies sleeve 54 as having been folded around the bead 59, over the inner mold 30 right side and across the inner mold crown. With the left end of the sleeve 54 shown about to be folded over the bead 59, as illustrated by curved arrows A.

FIG. 4F shows both the plies sleeve 54 ends as having been folded over the beads 59 and overlapping across the inner mold 30 crown. With the bead centering plates 57 shown being removed, as illustrated by arrows B.

Figure 5A:
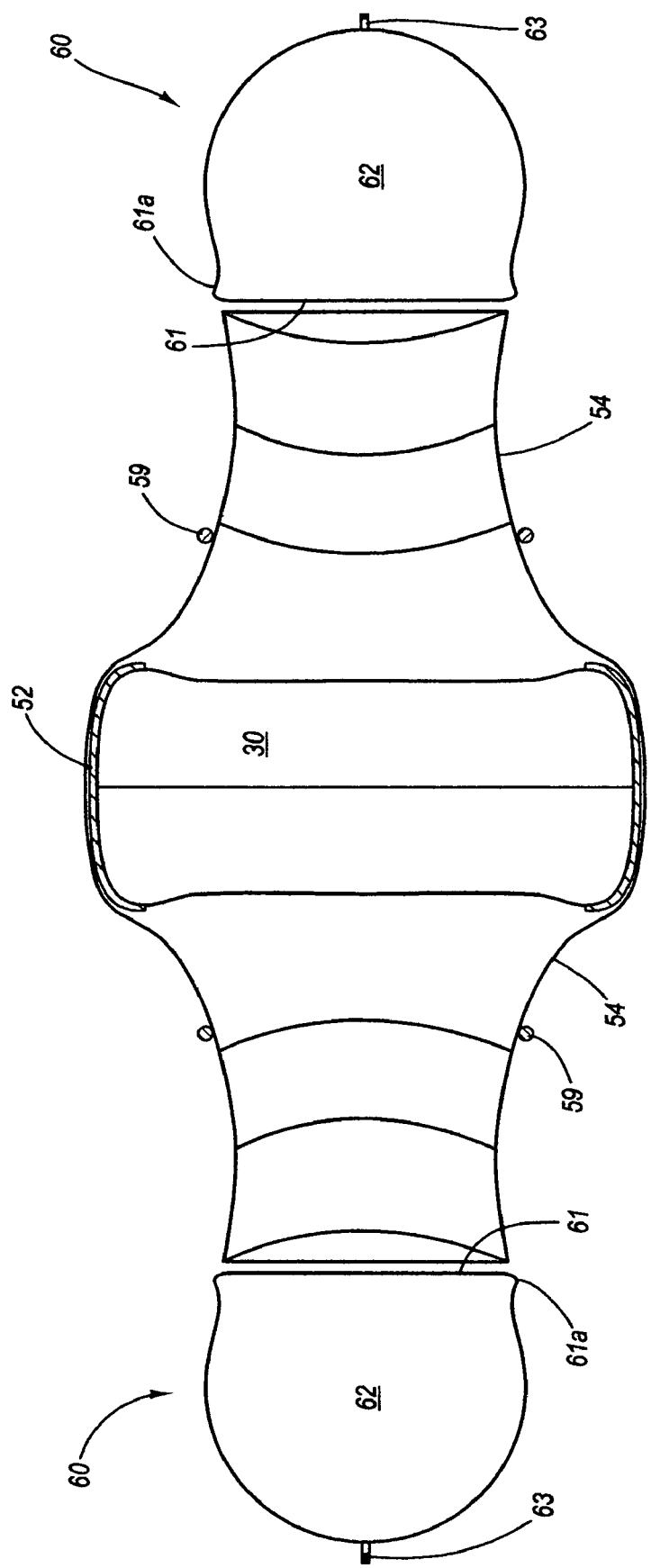
FIG. 5A is a view like that of FIG. 4D only showing a pair of bladder and hard plate assemblies for bead centering and plies cords positioning aligned with the ends of the plies sleeve.

FIG. 5A shows the view of FIG. 4D, except that a pair of bladder and hard plate 60 have been substituted for the bead centering plates for mounting the beads 59 onto the inner mold sides. Each bladder and hard plate 60 includes a hard plate 61, that is essentially a bead centering plate and performs its same function, that is mounted onto a side of a balloon type bladder 62 that is filled with air under pressure through a valve stem 63. Beads 59 are shown as having been slid along the sleeve 54 into position to receive the hard plate 61 ends 61a thereagainst and showing separator layer 52 wrapped around the inner mold 30 with the sleeve 54 having been passed thereover.

Figure 5B:
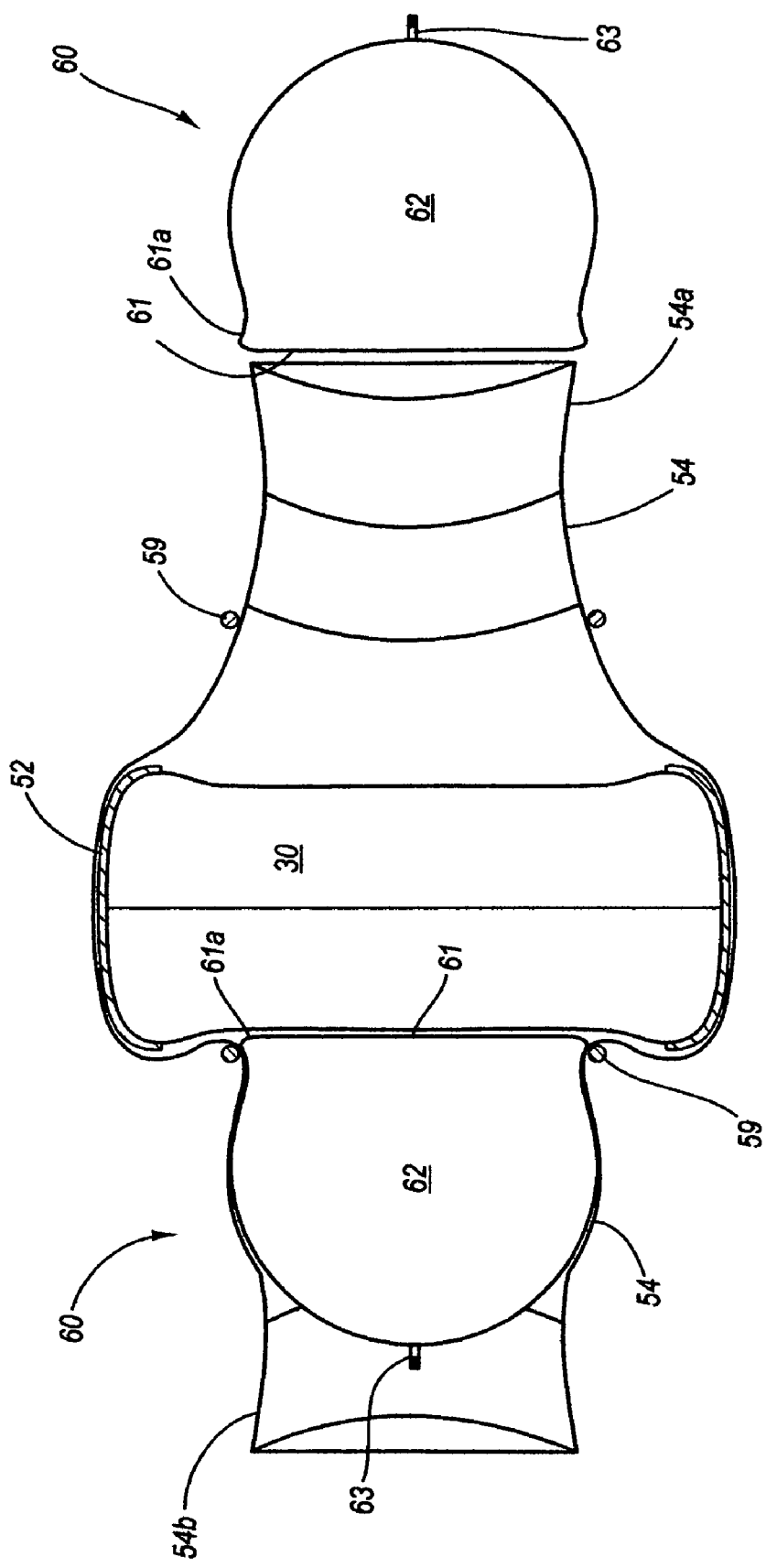
FIG. 5B is a view like that of FIG. 5A only showing the left bladder and hard plate assembly, that is preferably the bead centering plate, as having passed into the plies cords sleeve end to where the hard plate contacts the side of the hard core assembly and showing a bead maintained by the hard plate edge against the hard core assembly left side.

FIG. 5B is a view like that of FIG. 5A with the left side bladder and hard plate 60 shown as having passed into the plies sleeve 54 end to where the hard plate 61 edge 61a is in engagement with the bead 59, through the sleeve 54. Which bladder and hard plate 60 passage is made possible by appropriately filling the bladder 62 to a desired air pressure through the valve stem 63.

Figure 5C:
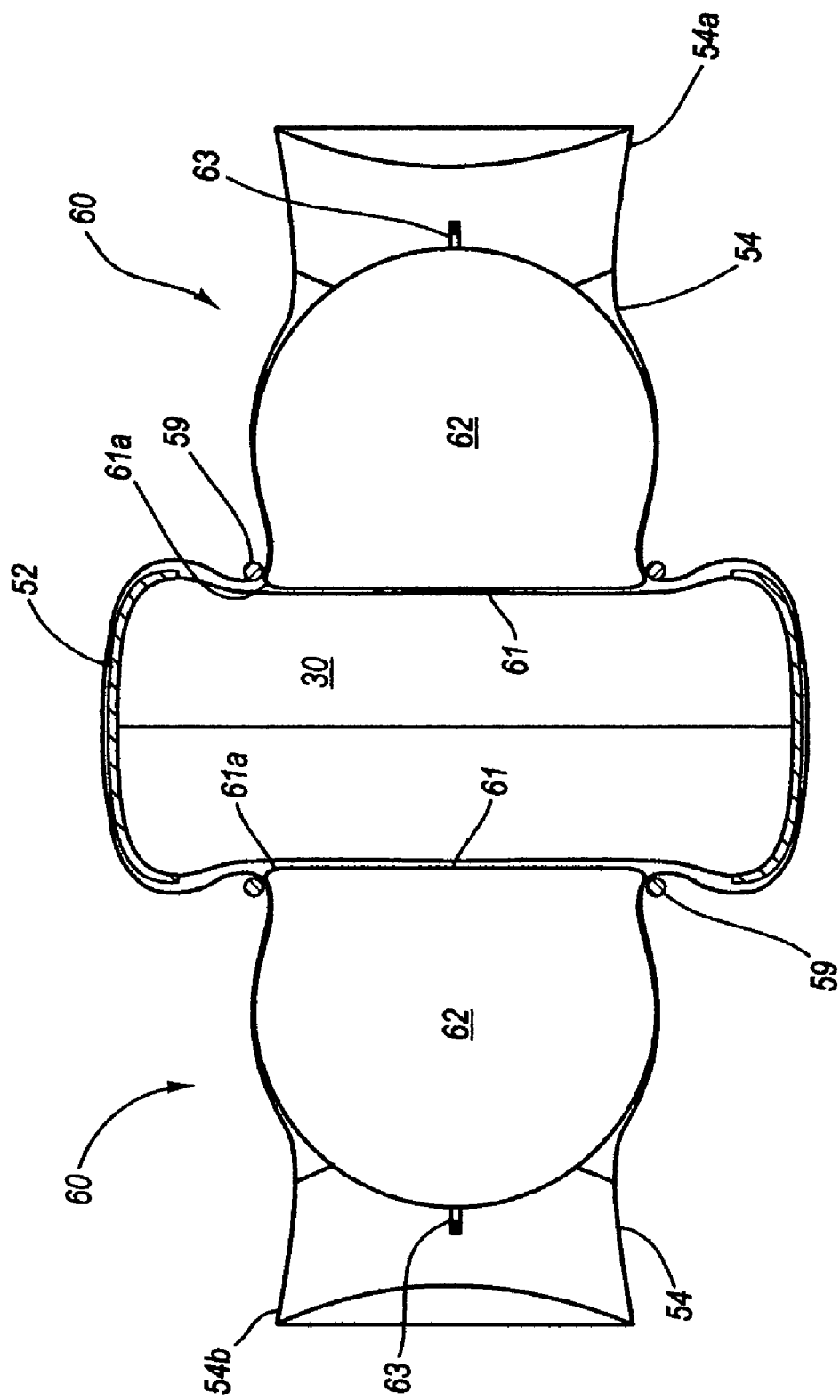
FIG. 5C is a view like that of FIG. 5B that additionally shows the right bladder and hard plate fitted into the plies cords sleeve end and showing a bead maintained by the hard plate edge against the hard core assembly right side.

FIG. 5C shows a view like that of FIG. 5B only showing both of the bladder and hard plates 60 as having been passed into the plies sleeve ends, with the beads 59 held against the sides of the inner mold 30, the plies sleeve 54 folded around the beads 59.

Figure 5D:
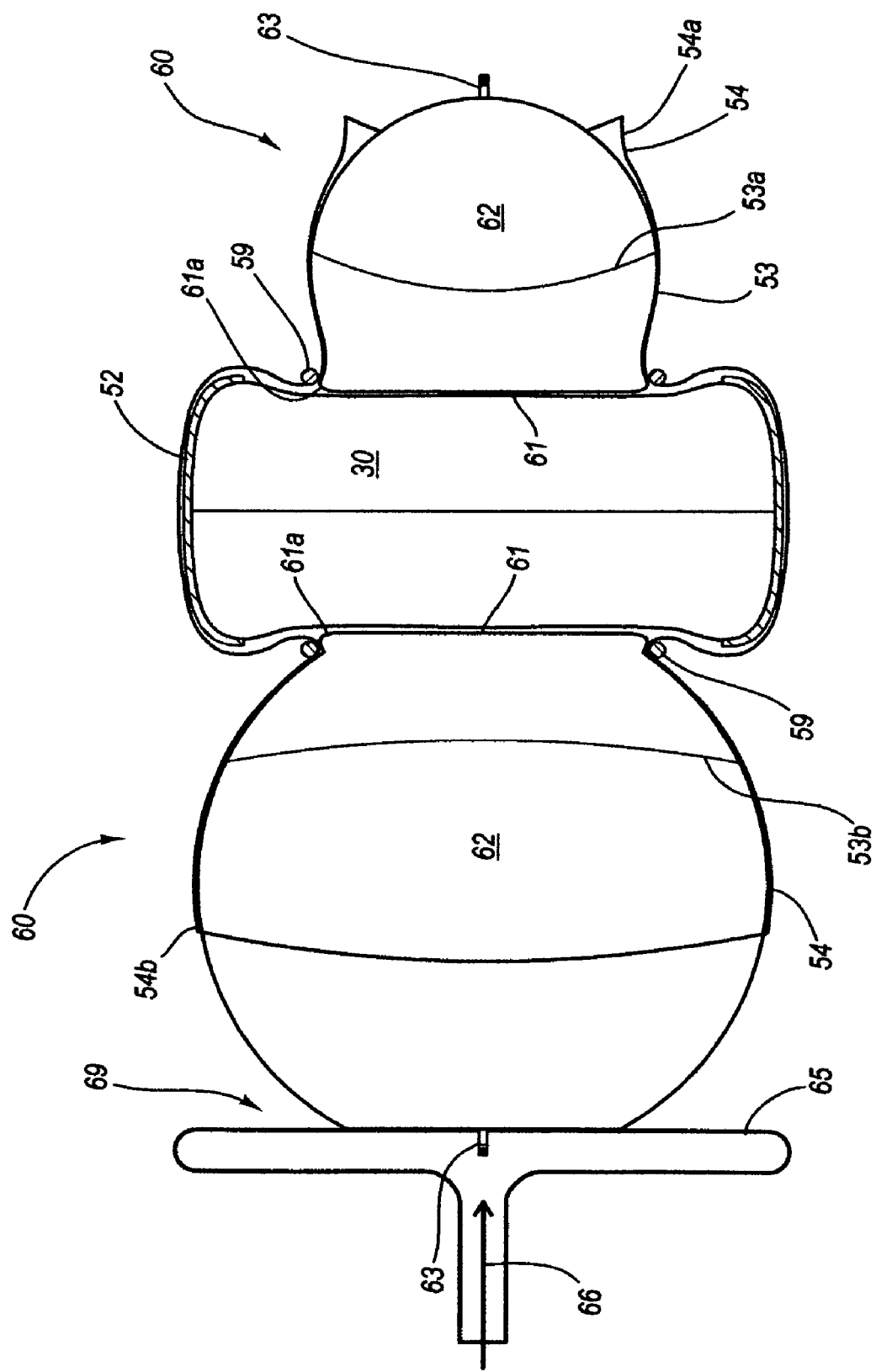
FIG. 5D is a view like that of FIG. 5C only showing a press plate engaging the expanded left bladder.

FIG. 5D is a view like that of FIG. 5C only showing the plies sleeve ends as having been cut to a lesser length to ends 54a and 54b and showing the bladder 62 of the left bladder and hard plate 60 as having been expanded with air, under pressure, passed through the stem 63, illustrated with arrow C. With that expansion, the plies sleeve end 54a is elevated to align with the side of the inner mold 30, and showing a pressure plate 64 in contact with, and pressing against, the expanded bladder 62. Which pressure plate includes a flat piston end 65 whose forward face is in contact with the expanded bladder 62, and a push rod end 66 that extends, at a right angle, from the piston end rear face. Of course, the plies sleeve 54 can be of lesser length avoiding having to cut off the sleeve ends and, also within the scope of this disclosure, the plies sleeve ends 54a and 54b can be left long and folded over the inner mold crown, like the arrangement shown in FIGS. 4E and 4F.

Figure 5E:
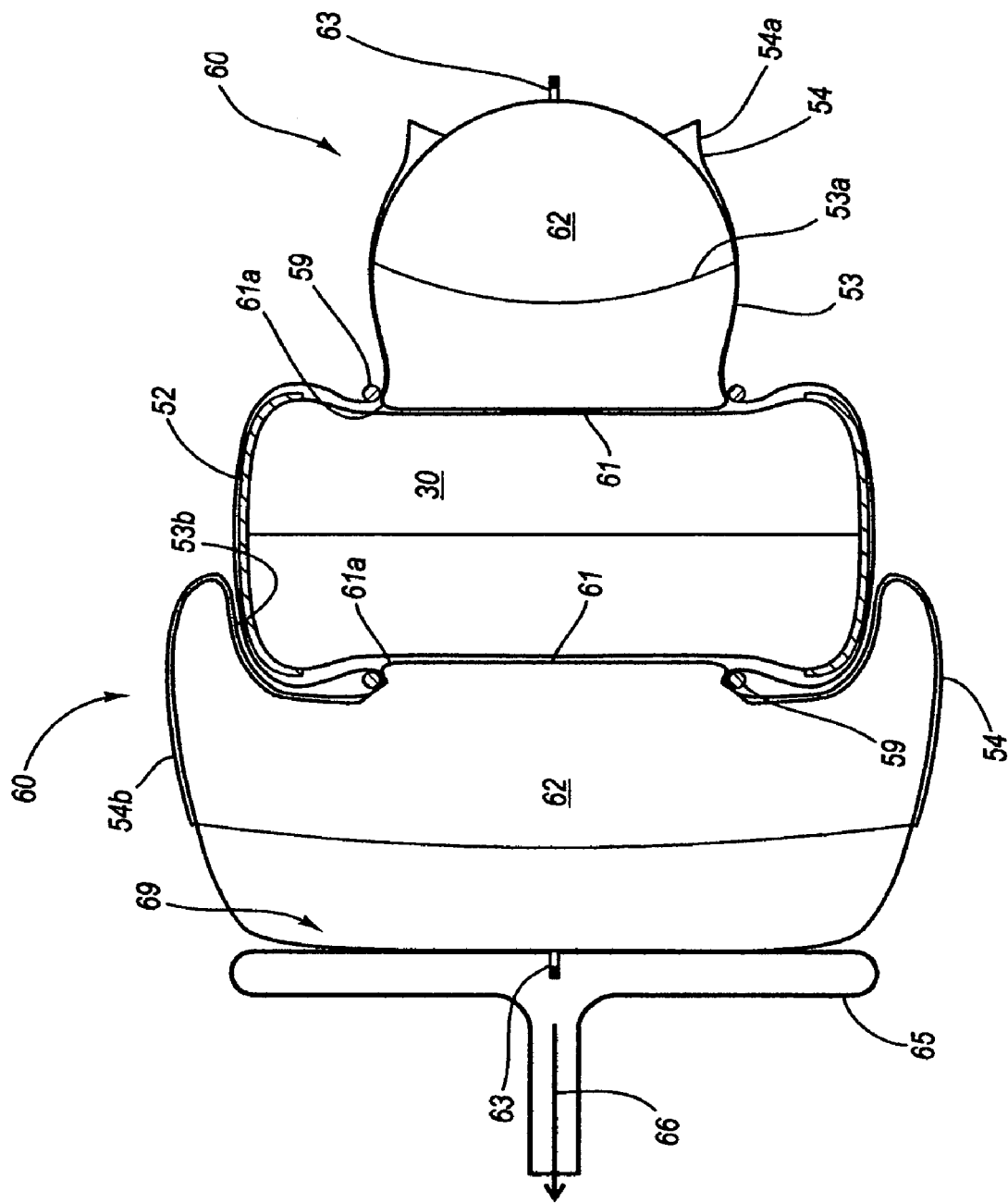
FIG. 5E is a view like that of FIG. 5D only showing the press plate as having been urged against the expanded bladder as air is removed from the bladder at a controlled rate, causing the bladder to fold the plies cords over the bead and up the left side of the hard core assembly.

FIG. 5E shows the pressure plate 64 as having advanced into the bladder 63, as air is being withdrawn from the bladder, illustrated by arrow D, and shows the bladder as tending to fold around the shoulder of the inner mold 30. Which bladder folding tends to urge the cords of the plies sleeve end 54a away from the bead 59, the with the cord ends folding onto the plies sides, and stretch across the inner mold 50. Which operation can include coating the plies cords above the plies with an adhesive, such as a pre cure elastomer, before the plies cords ends are moved by the deflation of the bladder 62.

Figure 5F:
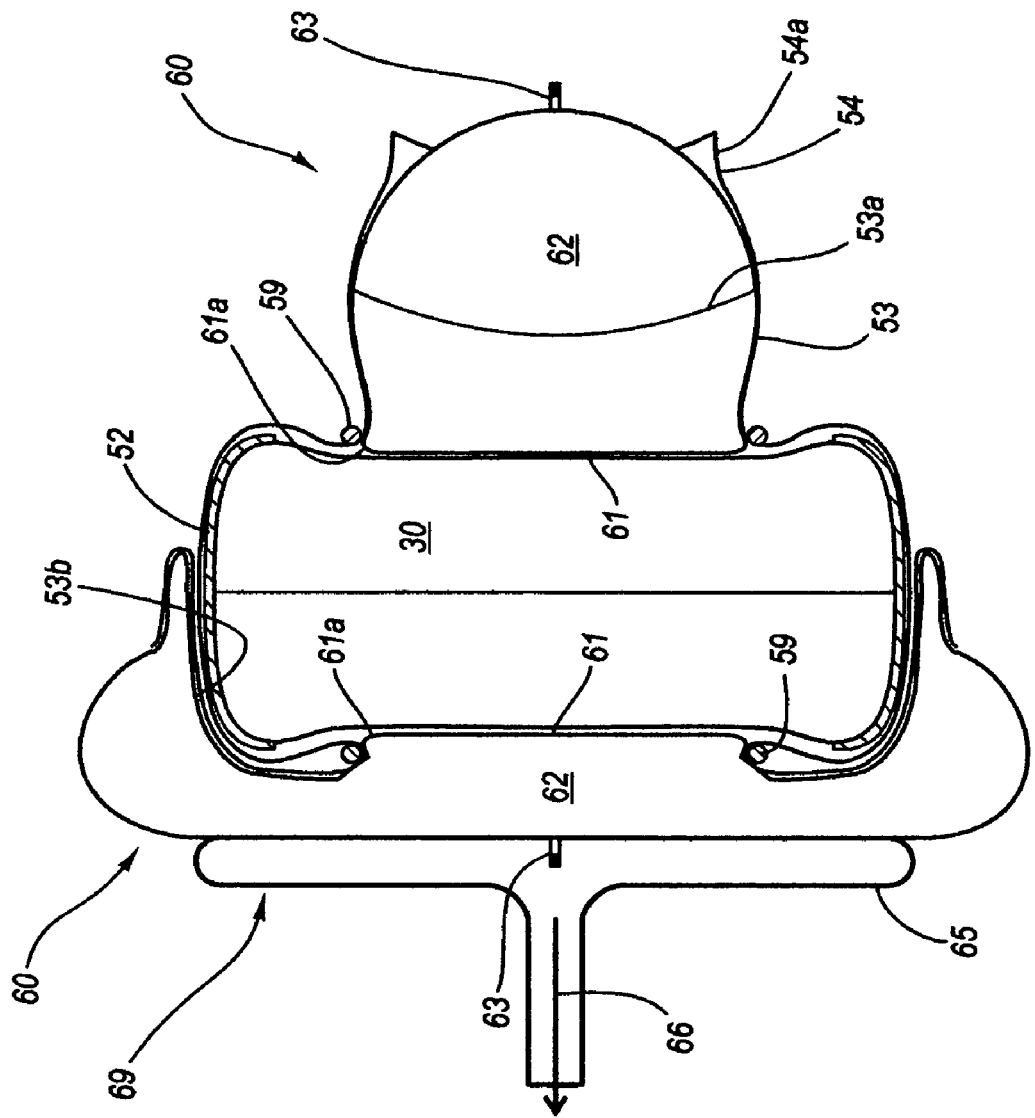
FIG. 5F is a view like that of FIG. 5E only showing the press plate as having been moved to its limit of travel against the bladder that has deflated to extend the bladder around the hard core assembly shoulders, pushing the plies cords ahead of the bladder surface.

FIG. 5F is a view like that of FIG. 5E only showing the bladder 62 as having been further deflated as air is continued to be withdrawn through stem 63, shown as arrow D. So arranged the bladder has flowed around the inner mold 30 shoulders with, in that flow, the bladder surface has tended to stretch the plies cords ends 53a away from bead 59 and urge the plies cords ends into close engagement with the plies cords above the bead. Which action tends to force any trapped air out from the bonding material and between the plies cords and plies cords ends. While the operation of the left bladder and hard plate 60 only has been shown it should be apparent that the operation of the right side bladder and hard plate 60 is identical and which bladders and hard plates 64 can operate simultaneously producing, when the bladders and hard plates are removed, a core of plies and beads that is ready to receive a belt or belts applied around the inner mold crown, as set out below.

The above description of FIGS. 4A through 4F and 5A through 5F provides a core of plies and beads formed onto the crown of the mandrel portion of the inner mold 30. With, in FIGS. 4A through 4F, the plies cords ends are shown folded over the beads and pulled across the inner mold crown, with, in FIGS. 5A through 5F, the plies cords are shown cut to fold to just above the bead but do not extend to beyond the inner mold shoulders.

Shown in FIG. 6A the core of plies and belts of either FIGS. 4A through 4F or FIGS. 5A through 5F has received a separator layer or layers 67 that are preferably sections of cotton batting installed around the inner mold 30 crown. Thereafter, a belt expander 68, that is like and functions like, and may be the same as, the truncated cone plies expander 53 except that its greater diameter end is of a diameter to fit over the side of the inner mold whereon have been formed the plies with separator layers, extending to at or near to the center of the inner mold crown. So arranged, shown in FIG. 6A, a first belt 69 and, as required, a second belt 69a can be passed over the belt expander 68 lesser diameter end and slid therealong, as illustrated by arrows E. The first belt 69 is fitted across the inner mold 30 crown followed by a separator layer 70, as shown in FIG. 6B, followed by the second belt 69a. Whereafter, the belt expander 68 is removed and a top separator or spacer layer 71 is applied to the top surface of the second belt 69a. A preferred spacing material is a four layer section of cotton batting that is approximately eight inches wide, and is wound circumferentially around the crown to hold the plies in place. The sides of which final separator layer 72 are, in turn, pulled down around the inner mold 30 shoulders, engaging the plies 54. Finally, a tire cord layer 72, as shown in FIG. 6B, is applied by winding a strand of tire cord around the belt circumference, with the winding starting on one side of the crown and proceeding to the other crown side, completing the assembly of the core of plies, belts and beads 75 of the invention.

For belt application set out in FIGS. 6A and 6B, the sleeves of belts 69 and 69a are formed separately by weaving methods where the belt cords are woven together to cross and have a twenty four degree cord angle to the center of the belt circumference, and after the first belt 69 is fitted to the inner mold, a layer of a separator 70, that is a gauze material, preferably cotton batting, having approximately four layers and is wrapped around the first belt 68 circumference. Whereafter, the second belt 69a, as set out above, is installed over the separator 70. Should additional belts be required, each belt is separated from the belts below and above by a separator, that is also preferably sections of cotton batting, with a final separator layer 71 applied over the top belt. A tire wrap 72 is applied over the final separator layer 71 that is preferably a Kevlar cord 72 that, as described above and as shown in FIG. 7F, as being wound off of a spool 73 and around the crown, the winding traveling from one side of the crown to the other.

Figure 7A:
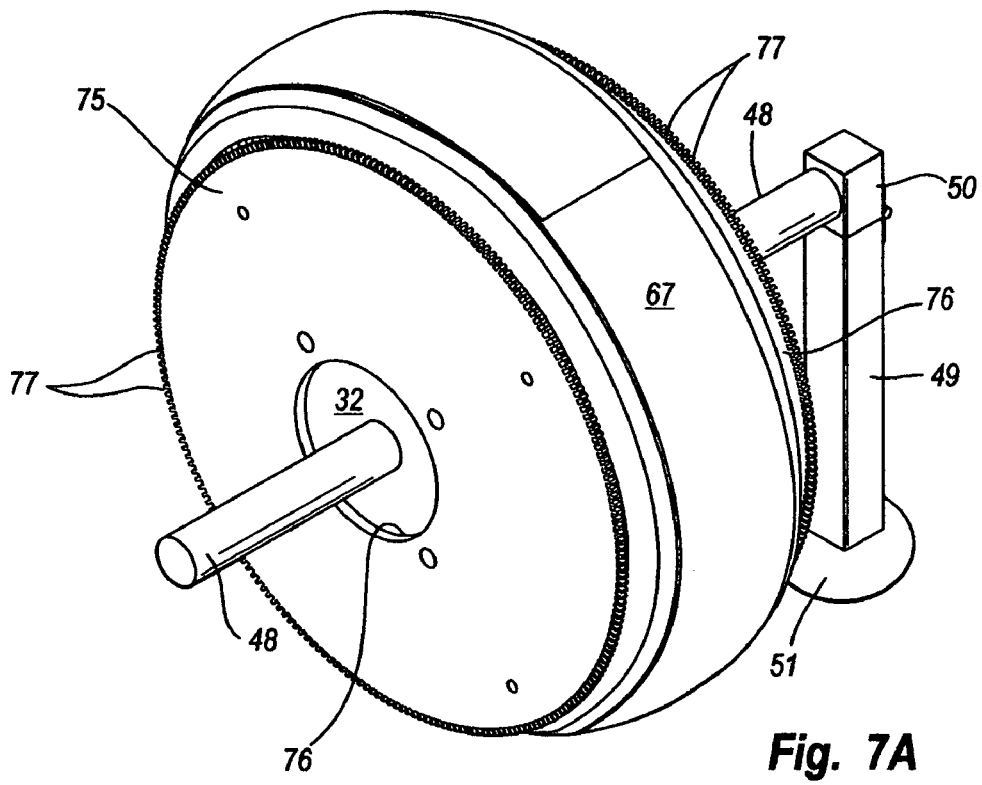
FIG. 7A shows an alternative arrangement for forming belts onto the inner mold circumference, above the plies, that includes a pair of gear plates that are each installed onto a side of the hard core assembly, and showing, in anticipation of weaving belts over the circumference, a section of cotton batting fitted, as a continuous belt, around the crown.
Figure 7B:
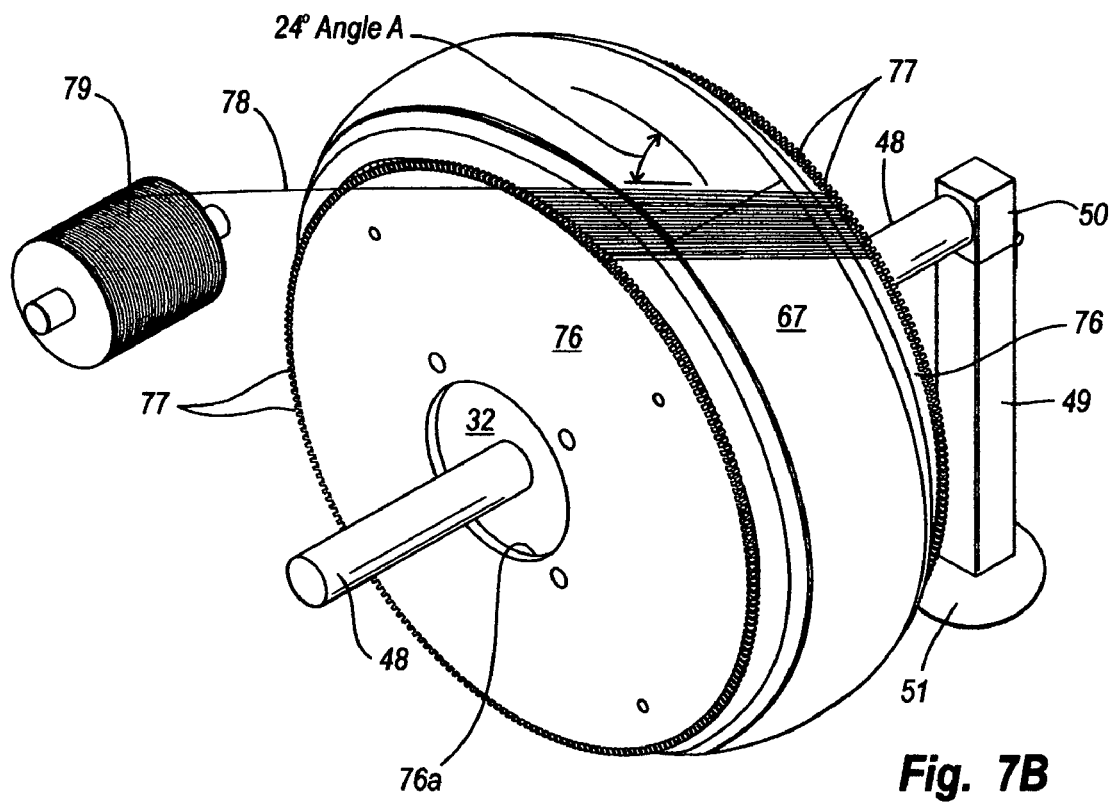
FIG. 7B shows a view like that of FIG. 7A showing a spool of belt cord with the belt cord shown being wound back and forth across and looping around the individual gear plate teeth, forming a belt section where the belt cords form a twenty four degree angle to a center line around the mandrel circumference.
Figure 7C:
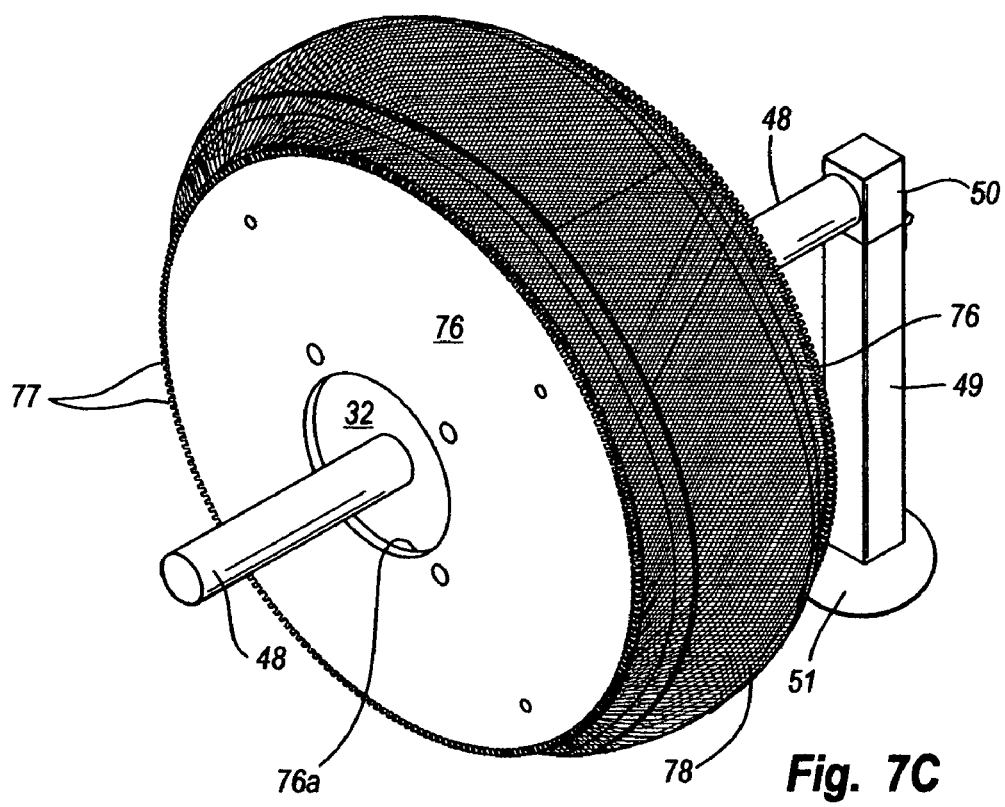
FIG. 7C shows a view like that of FIG. 7B after two belt sections have been wound between the gear plate teeth, each section formed at a twenty four degree angle to the mandrel center line, with the two belt sections forming a single belt.
Figure 7D:
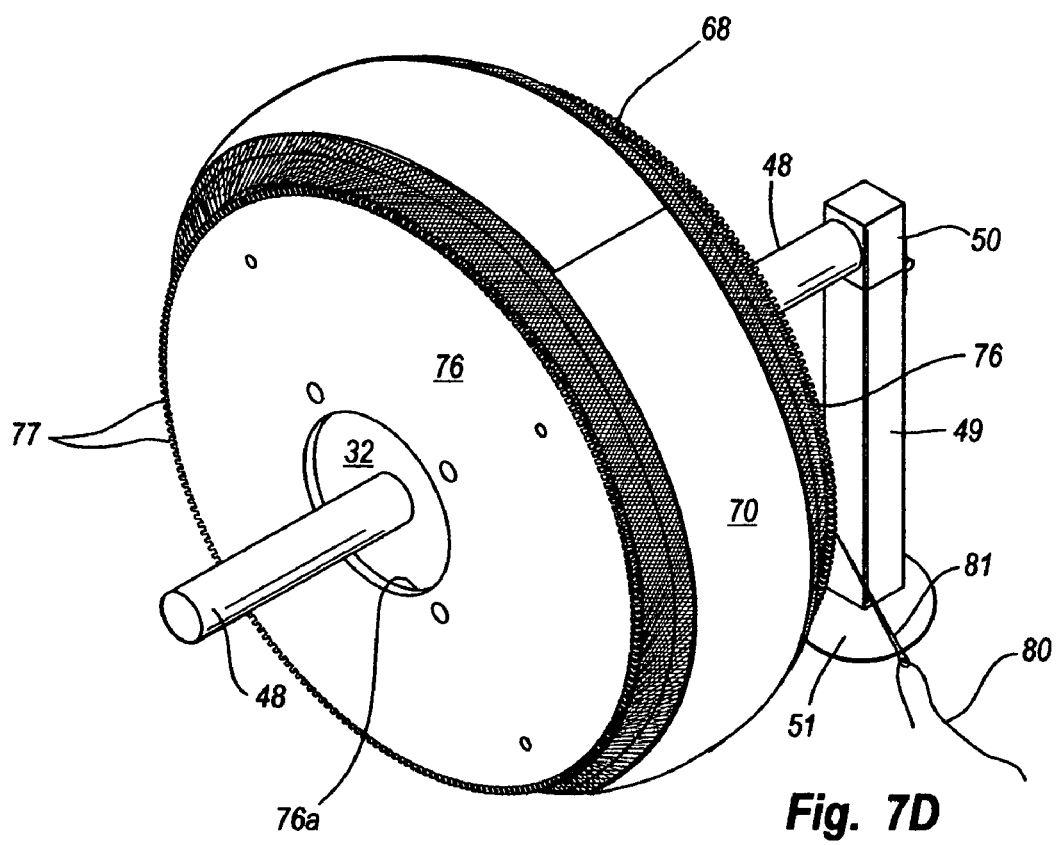
FIG. 7D shows a view like that of FIG. 7C with a layer of cotton batting shown wound around the core circumference, a threaded needle is shown being passed through the belt ends as they are picked off of the gear plate teeth and with a separator layer applied to the crown.
Figure 7E:
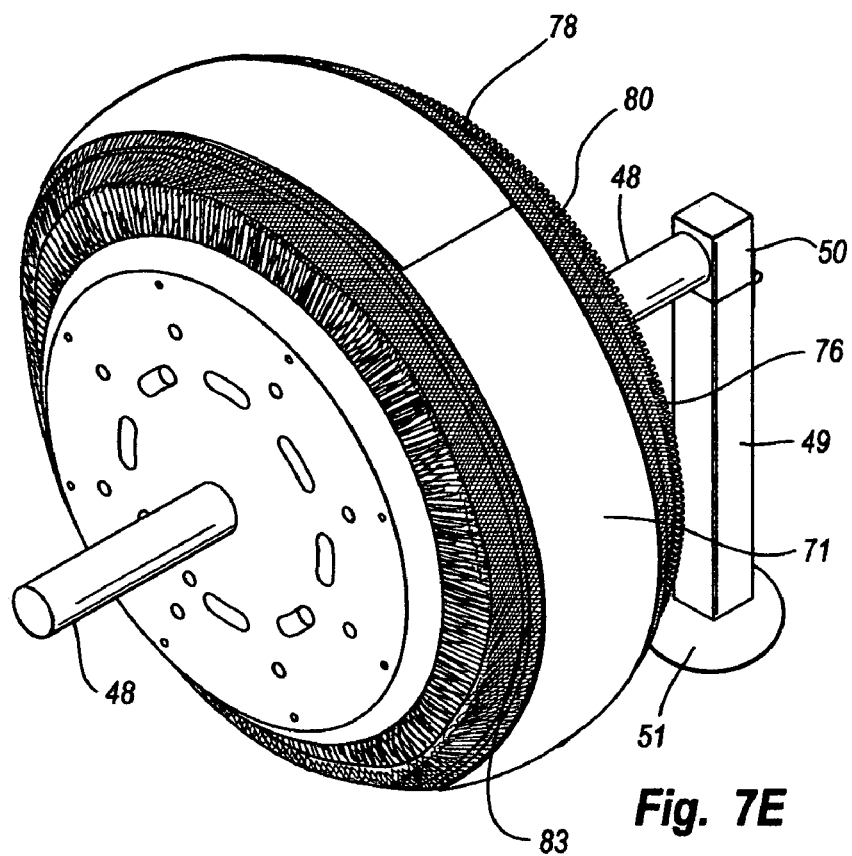
FIG. 7E is a view like that of FIG. 7D and with the threaded needle having passed through the belt loop ends on both sides of the crown and with the threaded ends pulled together, pulling the belts side down over the shoulders of the crown.
Figure 7F:
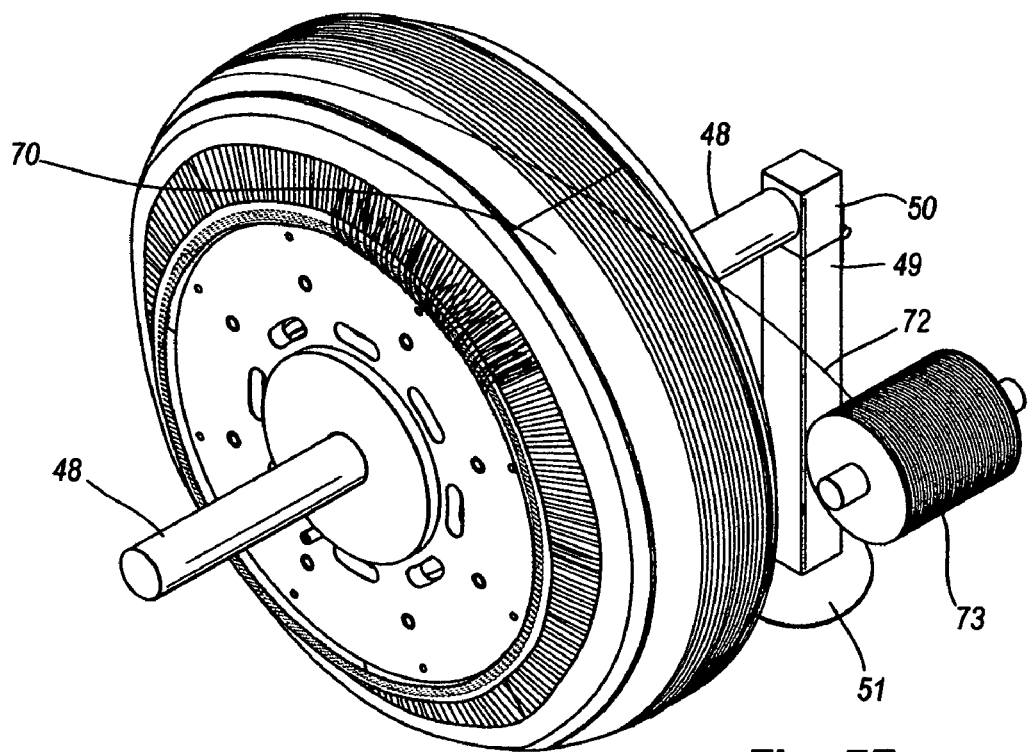
FIG. 7F shows a view like that of FIG. 7E and additionally illustrates, as a spool, cord being rolled off the spool and winding it around the crown that has been covered by a separator layer of cotton batting.
Figure 7G:
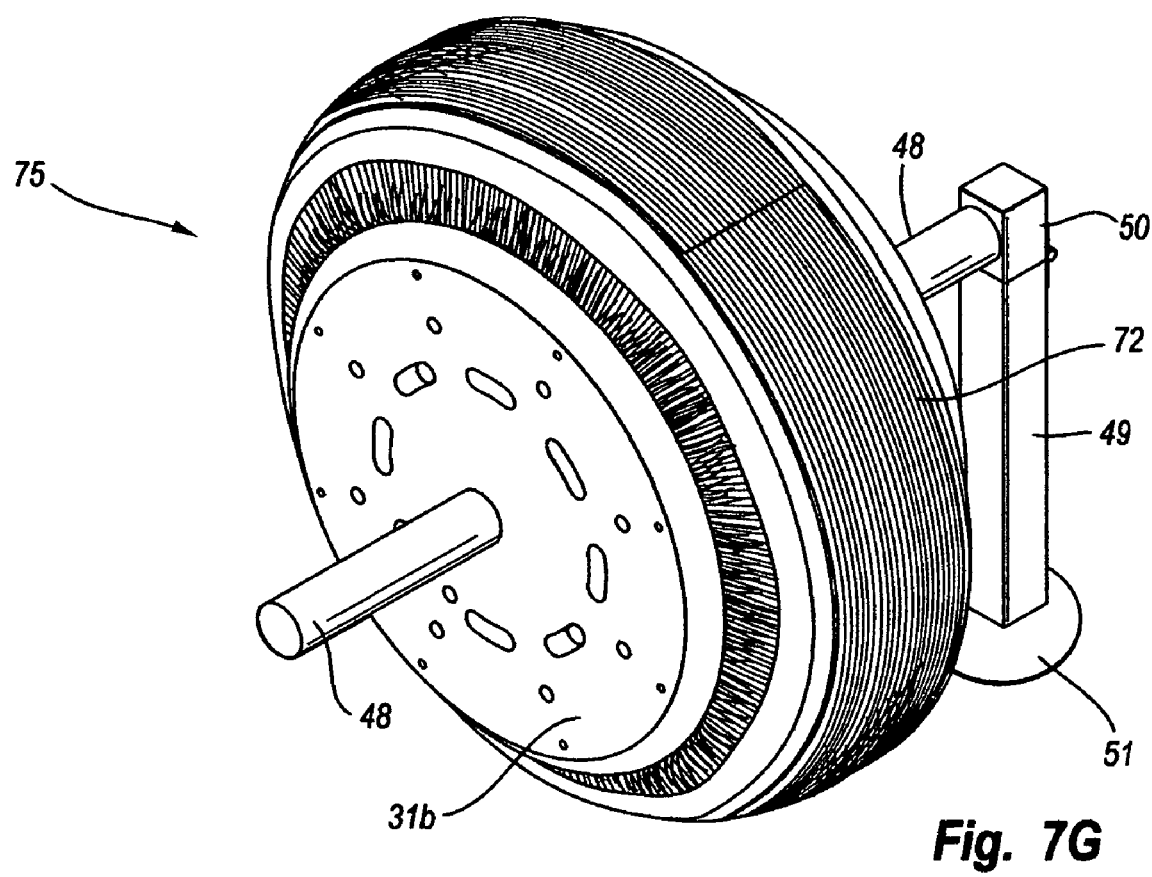
FIG. 7G shows a view like that of FIG. 7F only the wound tire cord as covering the crown.

As an alternative to the steps set out in FIGS. 6A and 6B, the belt 69 and 69a can be formed, as shown in FIGS. 7A through 7G, onto the inner mold 30 whereon has been built up the core plies and beads of FIGS. 4F and 5F and is maintained by axle 48 of the build stand that connects to pivot post 49, as shown in FIG. 4A. With a separator 67, that is a wrap of a four layer section of cotton batting, applied around the inner mold crown. To this arrangement, gear plates 76, each having center openings 76a, are fitted onto the opposite axle 48 ends and are each slid over a center dish 32 of the inner mold bases 31a and 31b. The gear plates 76 are positioned and held to the mold bases such that their teeth 77 align. To form a first belt segment over the separator 67 layer, as shown in FIG. 7B, a continuous belt cord 78 is wound on the bias from a tooth on one side of the gear plate to a tooth on the other gear plate. With the teeth over which a winding of belt cord 78 is taken being off set from one another to where the wound cord forms a twenty four degree angle A to a center of the inner mold crown around the circumference thereof. A spool 79 is shown in FIG. 7B as having the belt cord 78 wound thereon that is preferably cotton or rayon cord and, it should be understood, is to illustrate that the belt cord 78 is continuous for each belt segment.

A first belt segment is wound, as shown in FIG. 7B, whereafter a second belt segment is wound over the first except that the second belt segment is wound over teeth that are selected to provide that the cords of the second belt segment a slope that is opposite to the slope of the cords of the first belt segment, with the cords of the first and second belt segments each forming approximately twenty four degree angles to the circumference of the inner mold and crossing forming a first belt that is the equivalent of the first belt 69 of FIGS. 6A and 6B and so will be identified with the same number 69. Thereafter, as shown in FIGS. 6B and 7D, a separator layer 70 is applied around the circumference of the inner core, above the first belt 68. Which separator layer 70 is porous to pass a flow of liquid elastomer therethrough, and is preferably like a section of cotton batting like the separator 67 of FIG. 7A, and is preferably a four layer section of cotton batting having a width of approximately eight inches. Whereafter, as shown in FIG. 7D, the belt loop ends are picked off the gear 76 teeth 77 and a cord 80 is threaded through a needle 81 is passed through the belt loops, and the cord ends are pulled across one another to cinch the belt loop ends down the sides of the inner mold, and the cord 80 ends are tied together. A single belt 69 only, as formed as set out above, can be applied onto separator layer 67 or an additional belt or belts, like the belt 69a of FIGS. 6A and 6B, can be so formed, with each belt having a separator layer, as described, therebetween and a with a final separator layer 71, like that shown in FIG. 6B, is applied over the crown, as shown in FIG. 7E, and whose sides are pulled down the inner mold sides, over the belt loop ends. As a final step is the formation of the core 75, tire cord 72 that is shown being wound off of a spool 73 to illustrate that it is continuous, and is preferably a Kevlar cord, is wound around the core crown, winding from one side of the crown to the other, as illustrated in FIG. 7F. Such winding can be accomplished as by turning the inner mold and winding a Kevlar cord across the inner mold circumference, forming a Kevlar wrap 72 like that of FIG. 6B, and FIG. 7G, completing the core 75 formation on the inner mold 30 mandrel.

Figure 8A:
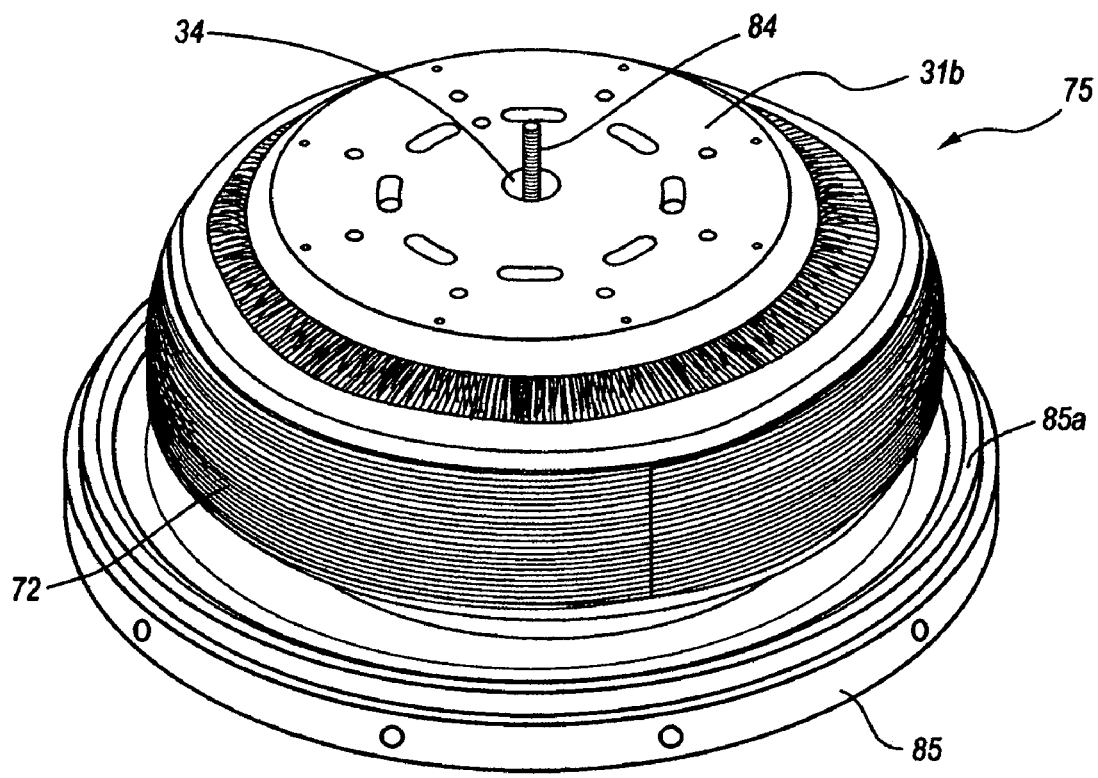
FIG. 8A shows the hard core assembly, with the tire core wound thereon, removed from the axle and positioned onto a mold base.

The core 75 is turned and is moved onto a mold base 85, as shown in FIG. 8A, that has a lifting rod 84 extending from the center thereof that is passed through the hub top 31b center opening and is for attachment to a lifting device for moving the inner mold 30 and core 75 mounted onto the mold base 85.

Figure 8B:
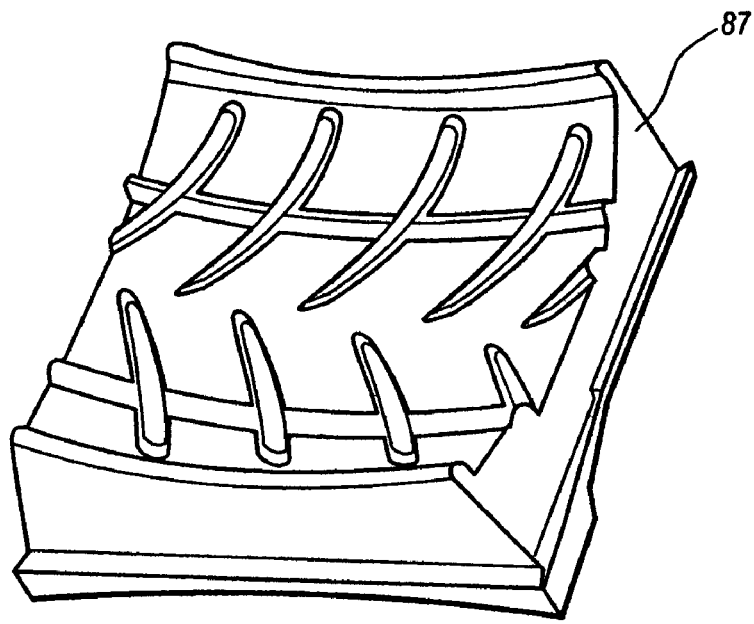
FIG. 8B shows one of a number of tread segments that are fitted together to form the exterior or outer mold.
Figure 8C:
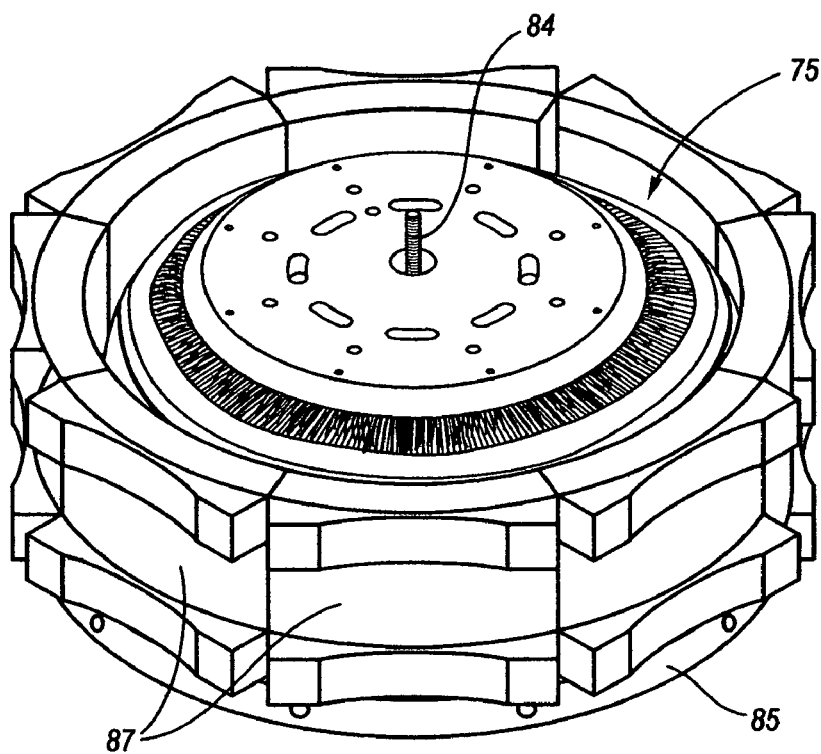
FIG. 8C shows the tread segments of FIG. 8B assembled into the mold outer wall.
Figure 8D:
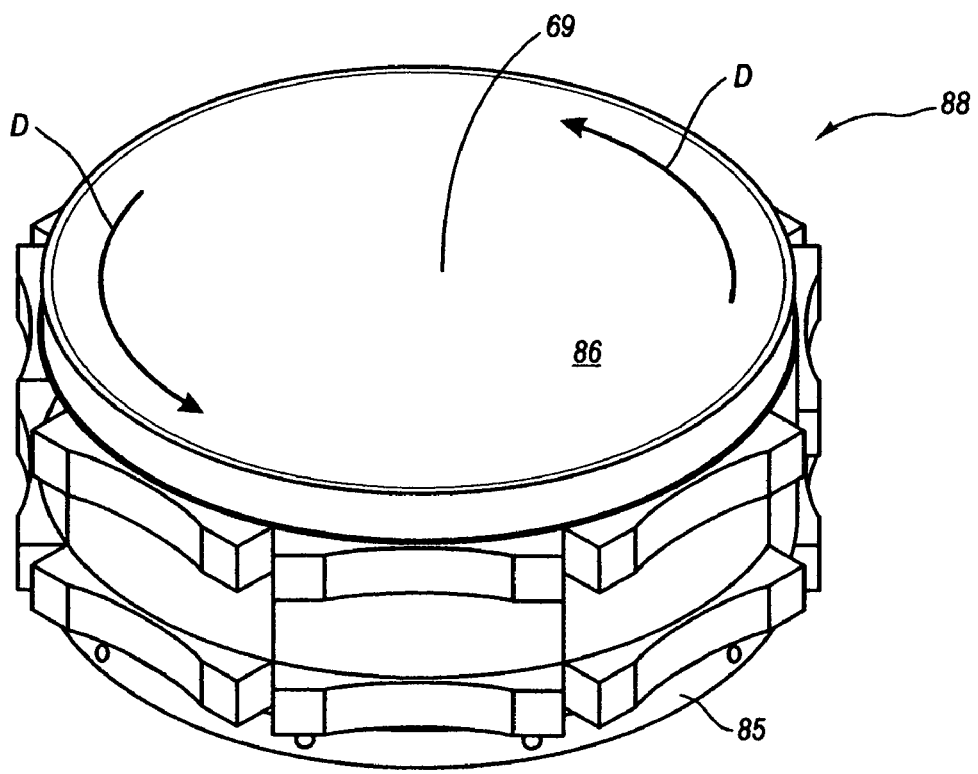
FIG. 8D shows a top plate installed onto the assembly of FIG. 8C with arrows D indicating the direction of mold spinning, showing a center opening wherethrough the liquid elastomer is poured in a spin casting process and showing a lifting rod centered in which center opening that will be removed after the mold is mounted in a casting well.

Shown in FIG. 8B is a tread segment 87 that is one of a number of like thread segments that are individually numbered and fitted together, in numerical order. As shown in FIG. 8C, eight tread segments 87 are used that are individually numbered from one to eight to fit, as shown in FIG. 8A, onto a lip 85a at a location on the mold base plate 85 whereon the corresponding number one through eight is scribed, forming a cylinder. The tread segments 87 are shown in FIG. 8C fitted around the mold base plate 85 leaving the top open, exposing lifting rod 84 that extends upwardly from the core 75 open center. Shown in FIG. 8D a mold top 86 has been fitted across the tread segments 87 completing the outer mold 88.

With the outer mold 88 formed, as shown in FIGS. 8A through 8D, it is moved utilizing the lifting rod 84 that is fitted through a cover plate 86 center opening 87 that is releasably attached to a crane or other lifting device that moves the assembly to a casting well. Whereafter, the lifting rod 84 is removed. The mold can then receive a flow of a liquid elastomer that is passed through a center opening 87 formed through mold top 86 as the mold is spun up to a speed of between 250 to 750 rpm, as indicated by arrow D in FIG. 8D. The mold spinning to cause the liquid elastomer to flow between and fill the area in the inner and outer molds 30 and 88, encapsulating the core 75, as shown in FIG. 9, within the tire 20, as shown in FIG. 10.

It should be understood that the invention is in the arrangement of a core 75 of plies, belts and beads, as shown in FIG. 9, is formed for positioning in a mold to receive an elastomer spun cast or molded around the core 75 that has been formed on the inner mold 30 mandrel, and is positioned within outer mold 88, forming, in a single casting operation, a tire 20, like that shown in FIG. 10. The elastomer constituents are preferably a liquid isocyanate and a liquid poly, respectively, that are selected to form, when they are combined and cured, an elastomer having a desired hardness or derometer for an automobile or like transport tire. The elastomer constituents are further selected to, when mixed, produce heat through an exothermic heat of reaction that is sufficient to cure a pre-cure elastomer if such is used in a practice of the process, as described above.

The invention, as described in detail above, is in a formation of a tire core 75 on an inner mold mandrel portion where tire plies, belts and beads are positioned and maintained in a stable attitude with the inner mold for subsequent fitting and positioning in the outer mold that an elastomer 90 is directed into, flowing around and through to encapsulate the core 75 inner and outer surfaces and flow through the core 75 of plies, belts and beads, to bond to the cotton or rayon cords as the plies and belts are formed from as well as flowing through and bonding with the spacers or separators between the inner mold, plies and belt or belts, that are preferably porous cotton batting, and through a final layer of Kevlar cord 72, forming a finished tire 20, as shown in FIG. 10. While not shown, it should be understood that the finished mold contains gate plate sections for directing a flow of liquid elastomer therethrough.

While preferred embodiments of our invention in a process and apparatus for forming a tire core and its use for the manufacture of a tire in a single molding operation, have been shown and described herein, it should be understood that variations and changes are possible to the method for the formation of the described tire core, and apparatus to form the tire core, and the materials used, without departing from the subject matter coming within the scope of the following claims, and a reasonable equivalency thereof, which claims we regard as our invention.

We claim:

1. A method for manufacturing a tire core on an inner mold mandrel having the shape of a tire inner surface and receives an outer mold fitted thereover that a flow of an elastomeric material is directed into in a spin casting operation where the mold annular area is filled and encapsulates the tire core, forming a tire comprising the steps of, assembling an inner mold that includes top and bottom hub plates with a hub fitted therebetween forming an assembly, with the assembly having a center passage therethrough and aligned ports and a mandrel having a shape of a tire interior wall encircling said hub, with said mandrel exterior surface to receive a core of plies, belts and beads built thereon; fitting an axle through said center passage and supporting at least an end of said axle on a build stand that allows the inner mold to be turned affording access to the mandrel sides and crown; fitting a layer of a porous spacing material around said mandrel crown; fitting a plies expander cone large diameter end over an edge of said spacing material to approximately the center of said mandrel crown; moving an end of a sleeve woven from plies cords over a lesser diameter end of said expander cone and moving it along said expander cone to travel across and beyond said mandrel crown; removing the plies expander cone and fitting inelastic beads over each plies sleeve end;

fitting a bead centering plate into each said plies sleeve end and sliding it therealong to where an edge of said bead centering plate picks up said bead and moves it into contact with a mandrel side; folding said plies sleeve over said bead, with said plies sleeve, after folding over said bead, urged into contact with the side of said plies, above said bead; applying a spacer layer formed of a flexible porous material around the mandrel crown, above said plies; applying a continuous belt that is a cylinder formed as a weave of belt cords that cross; fitting a spacing layer formed from a flexible porous material around said mandrel, on top of said belt; positioning a layer of tire cord around the crown; covering said belt; installing the inner mold onto an outer mold disk shaped base plate and fitting a cylindrical ring having tread embossed around its inner circumference on said outer mold base, adjacent to its edge, and capping said cylinder with an outer mold disk shaped top plate that has a center opening therein, completing the outer mold containing the inner mold mounting the core of plies, belts and beads in an annular area between said inner and outer molds, providing a finished mold for positioning in a casting well for spinning to receive a flow of liquid elastomeric material to encapsulate the core of plies, belts and beads in a finished tire.

2. The method as recited in claim 1, wherein the mandrel is formed from hard foam core segments which are in pairs of top and bottom segments that have like aligned holes formed through their truncated bases that are fitted over rods that extend upwardly from the bottom hub plate, and are assembled around the hub into a ring as the mandrel whose outer shape is that of a tire interior wall.

3. The method as recited in claim 1, wherein the build stand is an upright post having a knuckle pivotally mounted onto a top end that receives the axle end and allows for a rotation of said axle from a horizontal to a vertical attitude.

4. The method as recited in claim 1, wherein the porous spacing material is a wrap of cotton batting of sufficient width to extend across and is fitted around the crown of the mandrel.

5. The method as recited in claim 1, wherein the expander cone is a truncated cone that is arranged for fitting on and is movable along the axle and has a large diameter end to fit snugly over the mandrel crown and its lesser diameter end will accommodate the plies sleeve pulled thereover.

6. The method as recited in claim 1, wherein the plies sleeve is formed from a weave of plies cords and includes strands of an elastic material whereby the sleeve can stretch as it is moved along the plies expander cone and spring back into tight fitting engagement around the mandrel crown when the plies expander cone is removed.

7. The method as recited in claim 1, wherein the flexible porous spacing layer fitted over the plies around the mandrel crown is applied before the plies expander cone is removed and is a two layer section of cotton batting.

8. The method as recited in claim 1, wherein the belt is a sleeve woven from belt cord and is fitted onto a lesser diameter end of a belt expander cone whose greater diameter end fits over the top edge mandrel to approximately the mandrel center whereover the layers of plies and porous spacing layers have been fitted, and said woven belt is pull along said belt expander cone and onto, to extend from side to side across the crown of said mandrel.

9. The method as recited in claim 8, wherein the individual cords of the sleeve belt each slope at an angle of approximately twenty four degrees to the center of the crown.

10. The method as recited in claim 8, wherein a porous spacing layer is fitted over said belt; and a second belt is passed along said belt expander cone from less to greater diameter ends thereon and onto the mandrel, covering the porous spacing layer and first belt.

11. The method as recited in claim 8, wherein the belt expander cone is removed and a porous spacing layer is fitted around the mandrel crown, covering the belt and the sides of which porous spacing layer are pulled across the mandrel shoulder and onto the plies side walls.

12. The method as recited in claim 1, further including installing gear plates having like teeth on their outer circumferences onto the sides of the mandrel, with the gear teeth aligned, and lacing cotton or rayon belt cord on the bias between offset gear teeth around the mandrel circumference, forming a first belt segment where the segment cord is at approximately a twenty four degree angle to a center line around the circumference, and forming a second overlaying belt segment by lacing cotton or rayon belt cord on the bias between offset gear teeth around said mandrel circumference, forming a second segment that overlays with the cords of said first segment and with the belt segments cords sloping oppositely, each at approximately a twenty four degree angle to a center line around the mandrel circumference, forming a belt; and applying a porous separator layer over said belt.

13. The method as recited in claim 12, further including picking the belt cord loop ends off of the gear teeth and threading a cord through which loop ends, and forming a slide in a cord end that receives the other cord end pulled therethrough; and drawing the belt loop ends together, pulling said belt loops down the plies to hold the belt loop ends in place over the plies.

14. The method as recited in claim 13, wherein two or more belts can be overlaid around the mandrel crown with a porous spacing layer formed from a section of rayon or cotton material that is four layer of cotton batting, approximately eight inches in width, and is secured as a continuous belt around the inner mold circumference, above a final or top belt.

15. The method as recited in claim 14, further including, after the application of the final porous spacing material layer on top of the top belt, rotating the inner mold to wind a tire cord as a circumferential wrap over said final porous spacing material layer, winding from one side of the crown to the other.

16. The method as recited in claim 1, wherein, with the completion of the outer mold containing the inner mold mounting the core of plies, belts and beads, the core is positioned in an annular area between said inner and outer molds, and said mold is positioned in a casting well and spun to a velocity of between 250 and 750 rpm as a flow of liquid elastomeric material is passed through the outer mold top plate center opening, filling the annular area and encapsulate the core of plies, belts and beads in a finished tire.

17. Apparatus for forming a core of plies, belts and beads mounted in an annular area of a cavity mold to receive a flow of an elastomeric material passed therein for spin casting a tire comprising, an inner mold having a crown as a mandrel that receives a core of plies, belts and beads built up thereon; a plies expander cone having greater and lesser diameter ends, with said greater diameter end to fit over an edge of said mandrel, onto said crown, and said lesser diameter end to receive a plies sleeve that is a sleeve woven of plies cords and is to be slid along said plies expander cone and off of said greater diameter cone end to pass across said crown of said mandrel; a pair of bead centering plates that are each for fitting in an end of said plies sleeve and each includes an edge that is of a diameter to capture a bead arranged on the outside of each said plies sleeve and to move said bead into a centered position on a side of said mandrel, folding said plies sleeve over said bead; means for positioning a belt formed from a weave of belt cords around said mandrel crown, above said plies; an outer mold that receives said inner mold positioned therein that includes a cylinder fitted around said inner mold that includes a tire tread formed around said cylinder inner surface; and said outer mold has a passage for passing a flow of an elastomeric material into the annular area between said inner and outer molds.

18. The apparatus as recited in claim 17, wherein the inner mold includes top and bottom hub plates that are like round disks with said top hub plate having a center hole therethrough, and each said hub plate is to accommodate a cylindrical hub; means for connecting said top and bottom hub plates to said cylindrical hub to align spaced holes, forming open passages therethrough to provide flow pathways to a liquid elastomeric material, and said top and bottom hub plates include straight spaced studs with means for coupling each said stud end to each said top and bottom hub plate and the mandrel consists of pairs of top and bottom hard foam cores that fit together with like pairs to form said mandrel having a shape of a tire interior wall, and which hard foam cores have pie shapes with truncated bases wherethrough holes are formed to slide over one of said spaced studs, maintaining said hard foam cores between said top and bottom hub plates.

19. The apparatus as recited in claim 17, further including a pair of closed bladders that, when deflated, can each be fitted into one of the plies sleeve ends, with each said bladder including a means for passing air into and withdrawing it from said bladder, with each said bladder to fit to a rear surface of the bead centering plate, and each said bladder receives a pressure plate that urges bladder collapse as air is exhausted therefrom, folding said bladder surface against the side of the inner mold to capture the plies ends and urging them up from the bead along the sides of said inner mold.

20. The apparatus as recited in claim 17, further including, as the means for positioning a belt onto the mandrel, above the plies and a porous separator layer, a belt expander cone having a greater diameter forward end to fit over the mandrel whereon plies and porous separator layers have been positioned and a lesser diameter rear end that a first belt sleeve woven from belt cord is urged along said belt expander cone, traveling off said belt expander cone and onto said mandrel, above a porous spacer positioned over the plies.

21. The apparatus as recited in claim 20, further adapted such that a second belt sleeve is passed along the belt expander cone and travels off said belt expander cone and onto a porous separator layer positioned over the first belt sleeve.

22. The apparatus as recited in claim 18, further including a pair of identical gear plates each arranged to fit onto and be centered on one of the hub plates, each gear plate having upstanding teeth whose tops approximately align with the circumference of the mandrel; and means for mounting said gear plates onto the hub plates to maintain the alignment of the gear plates teeth.

23. The apparatus as recited in claim 17, wherein the outer mold has a center opening in its top for receiving a flow of liquid elastomeric material therethrough; and the cylinder fitted around the inner mold is a plurality of tire tread segments that are for assembly into a cylinder between outer mold top and bottom surfaces.

24. The apparatus as recited in claim 23, wherein the tread segments interior surfaces each have a tread designed formed therein and are individually numbered from one to eight to correspond with numbers on a mold base that are located at spaced intervals around an outer lip of said mold base, which said tread segments are assembled in numerical order between said mold base and top, forming the cylinder having a continuous interior outer wall that will mold a tread into the tire.

25. The apparatus as recited in claim 18, wherein the hub and hub plates include spaced holes that are curved elliptical openings as the spaced holes that form passages therethrough; and means for directing a flow of liquid elastomeric material passed in through a center opening through the top mold base and into said curved elliptical openings.

26. The apparatus as recited in claim 17, further comprising a means for maintaining said mandrel in both vertical and horizontal attitudes comprising a build cradle which includes an axle having an end attached to a knuckle that allows for rotation of said axle and pivoting from a horizontal to vertical attitude, and which said knuckle is attached to a fixed vertical post.

* * * * *